United States Patent [19]

Larsen et al.

[11] 3,825,895

[45] July 23, 1974

[54] OPERAND COMPARATOR

[75] Inventors: Dee E. Larsen, San Jose; Michael R. Clements, Santa Clara, both of Calif.

[73] Assignee: Amdahl Corporation, Sunnyvale, Calif.

[22] Filed: May 14, 1973

[21] Appl. No.: 360,331

[52] U.S. Cl. .............................. 340/146.2, 235/177

[51] Int. Cl. .............................................. G06f 7/04

[58] Field of Search .......... 340/146.2; 235/177, 164

[56] References Cited

UNITED STATES PATENTS

| | | | |
|---|---|---|---|
| 3,241,114 | 3/1966 | Zieper et al. | 340/146.2 |
| 3,316,535 | 4/1967 | Fought | 340/146.2 |
| 3,363,233 | 1/1968 | Petzold | 340/146.2 |
| 3,390,378 | 6/1968 | Dryden | 340/146.2 |
| 3,492,644 | 1/1970 | Jensen | 340/146.2 |
| 3,601,804 | 8/1971 | Wainwright et al. | 340/146.2 |
| 3,660,823 | 5/1972 | Recks | 340/146.2 |

*Primary Examiner*—Charles E. Atkinson
*Assistant Examiner*—Jerry Smith
*Attorney, Agent, or Firm*—Flehr, Hohbach, Test, Albritton & Herbert

[57] ABSTRACT

Disclosed is a digital data processing system and comparator for comparing operands for equality relationships. The operands are compared on a bit-by-bit basis from the highest-order bit toward the lowest-order bit. The comparison is carried out simultaneously and in parallel for all bits. The equality relationships determined by the comparison are greater than, less than, equal to, and overflow in the case of fixed point additions and subtractions. The comparisons are valid for positive and negative numbers in fixed point and normalized floating point arithmetic.

17 Claims, 11 Drawing Figures

OPERAND COMPARATOR

CROSS REFERENCE TO RELATED APPLICATIONS

1. DATA PROCESSING SYSTEM, Ser. No. 302,221, filed Oct. 30, 1972, invented by Gene M. Amdahl, Glenn D. Grant, and Robert M. Maier, assigned to Amdahl Corporation.
2. CLOCK APPARATUS AND DATA PROCESSING SYSTEM, Ser. No. 302,222, filed Oct. 30, 1972, invented by Glenn D. Grant, assigned to Amdahl Corporation now U.S. Pat. No. 3,792,362.
3. CONDITION CODE DETERMINATION AND DATA PROCESSING SYSTEM, Ser. No. 360,392, filed May 14, 1973, invented by Dee E. Larsen and Michael R. Clements, assigned to Amdahl Corporation.

BACKGROUND OF THE INVENTION

The present invention relates to the field of data processing systems and specifically to comparators for comparing operands in data processing systems.

In many data processing systems, instructions requiring comparisons of operands frequently are performed employing successive additions or substrations which utilize a plurality of recursive cycles of the execution unit for completion. Such systems require relatively long execution times which are undesirable in high performance systems.

The effects of long execution times such as results from recursive operations are cumulative in systems where instructions are prefetched or preprocessed. For example, where a branch instruction is conditioned upon a comparison of operands for some equality relationship, a decision must be made as to whether a targeted instruction stream identified by the branch instruction or the unaltered non-branch instruction stream is to be taken. While the prefetching and preprocessing of both instruction streams may avoid the delay, that solution necessitates expensive redundant apparatus. Alternatively, to wait for execution of the instruction and the responsive setting of the condition code is wasteful of valuable processing time. In view of these problems, there is a need for improved operand comparators which perform highspeed comparisons and enable the early setting of condition codes.

SUMMARY OF THE INVENTION

The present invention is a method and apparatus for use in a data processing system for comparison of operands to determine equality relationship. Operands are compared on a bit-by-bit basis from high-order bit to low-order bit. The bit-by-bit comparison is performed to detect the first equality relationship between corresponding bits. That first equality relationship is either identity (corresponding bits equal) or non-identity (corresponding bits unequal). The comparison is carried out for positive and negative operands in fixed point or normalized floating point arithmetic. The comparisons determined are greater than, less than, equal to and overflow in the case of fixed point additions and subtractions.

For floating point arithmetic the first equality relationship is non-identity. Similarly, for fixed point arithmetic where both operands are positive or both operands are negative, the first equality relationship is non-identity. For fixed point arithmetic where the operands are of opposite signs, the first equality relationship is identity.

In the case of overflow detection, the equality relationship is combined with signals specifying whether a substract or an add instruction is being specified.

In a preferred embodiment, two 32 bit operands are compared, on a bit-by-bit basis, simultaneously and in parallel for finding the first equality relationship.

In accordance with the above summary of the invention, an improved operand comparator is provided for performing highspeed comparisons which are suitable for the early setting of condition codes utilized in controlling instruction processing.

The foregoing and other objects, features and advantages of the invention will be apparent from the following more particular description of preferred embodiments of the invention as illustrated in the accompanying drawings.

DETAILED DESCRIPTION

Overall System

Figure 1:
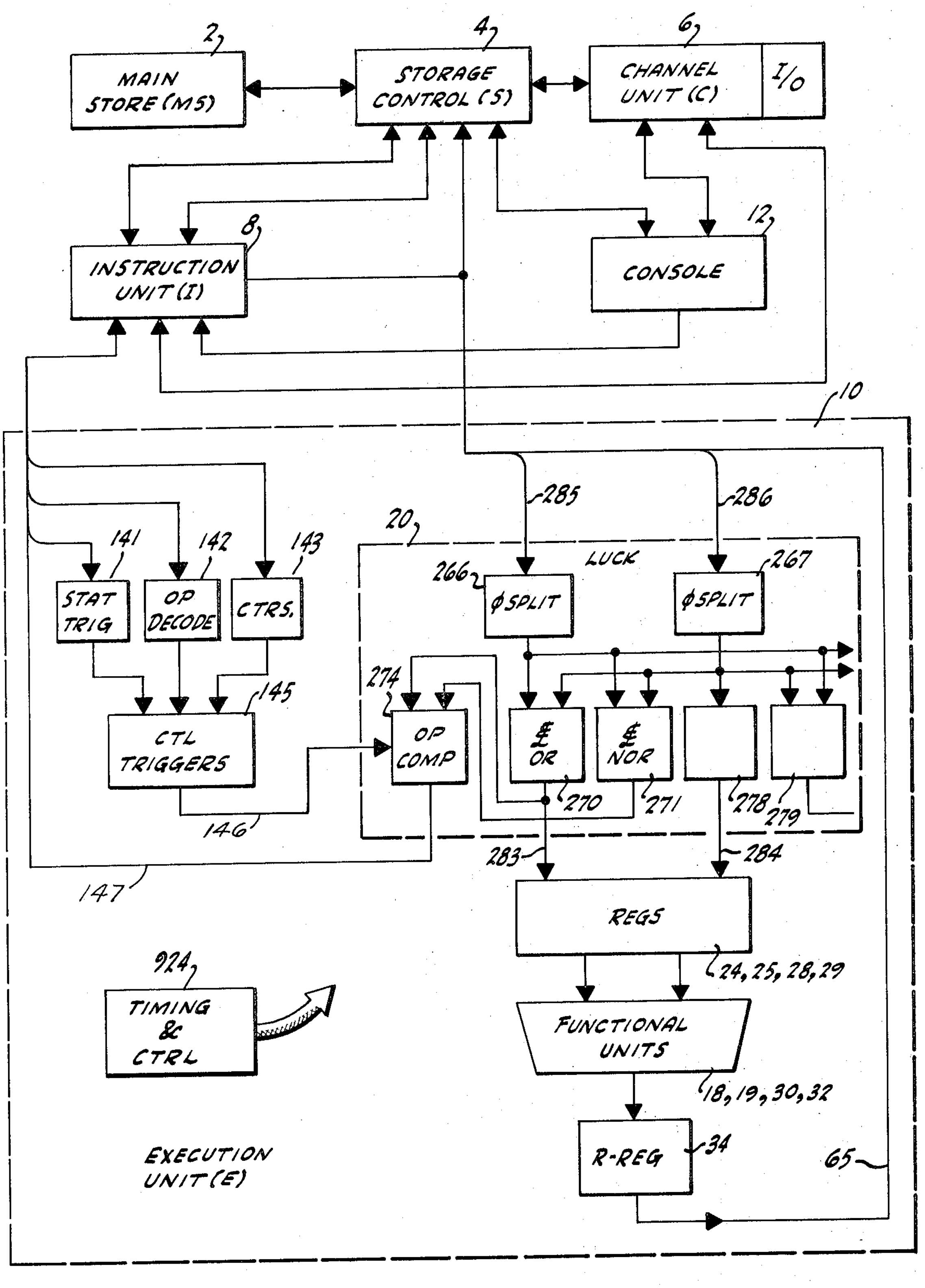
FIG. 1 depicts a block diagram of the data processing system with an expanded view of the execution unit which includes the operand comparator of the present invention.

In FIG. 1, the data processing system of the present invention is shown to include a main store 2, a storage control unit 4, an instruction unit 8, an execution unit 10, a channel unit 6 with associate I/O and a console 12. The system of FIG. 1 operates under control of instructions where an organized group of instructions form a program. Instructions and the data upon which the instructions operate are introduced from the I/O equipment via the channel unit 6 through the storage control unit 4 into the main store 2. From the main store 2, instructions are fetched by the instruction unit 8 through the storage control 4 and are processed so as to control the execution within the execution unit 10. The system of FIG. 1 is, for convenience, compatible with the IBM System/360 and accordingly, general details as to the operation of data processing systems may be had by reference to the following publications: "IBM System/360 Principles of Operation", IBM Systems Reference Library, Form A22-6821. "Introduction to IBM System/360 Architecture", IBM System Reference Library C20-1667. " A Programmer's Introduction to the IBM Systems/360 Architecture, Instructions, and Assembler Language," IBM Systems Reference Library C20-1646. "IBM System/370 Principles of Operation", IBM Systems Reference Library GA22-7000.

The above publications are hereby incorporated by reference into this specification for the purpose of teaching the general operation of data processing systems, for identifying nomenclature, and for defining the architectural requirements of the Systems/360 and 370.

By way of introduction, the information format in the above data processing systems organizes eight bits into a basic building block called a "byte". Each byte also typically includes a ninth bit for parity used in error detection. Although express mention of the ninth bit in each byte is not generally made throughout this specification, it is assumed that there is a parity bit associated with each byte and that the normal parity checking circuitry is included throughout the system in a well-known manner.

Two bytes are organized into a larger field defined as a half-word, and four bytes or two-half words are organized into a still larger field called a word. Two words form a double word. A word is four consecutive bytes. While these definitions are employed in the specification, it will be understood that words or bytes can equal any number of bits.

Various data formats may be employed in the environmental system so that instructions and operands may be of different length depending upon the particular operation which is to be carried out. The instruction formats include RR, RX, RS, SI, and SS. As a typical example, the RX instruction includes an 8-bit OP code, a 4-bit R1 code, a 4-bit X2 code, a 4-bit B2 code and a 12-bit D2 code. The OP code specifies one out of a possible 256 instructions. The R1, X2 and B2 fields each identify one of 16 general registers. The D2 field contains a displacement number between 0 and $2^{12}$. As an example of the RX instruction, the ADD instruction adds the contents of the register identified by the R1 field to the contents of the main storage location addressed by the sum of the number in the D2 field added to the contents of the register identified by the X2 field again added to the contents of the register identified by the B2 field. The result is placed in the register identified by the R1 field. The RX instructions require two accesses to storage for execution, one to fetch the instruction and one to fetch one of the two operands. RR instructions require one storage access while SS instructions require three or more.

Execution Unit

Still referring to FIG. 1, the E-unit 10 includes a plurality of functional units indicated generally as 18, 19 30 and 32 as well as a functional unit indicated as LUCK unit 20. Data enters the E-unit 10 through the LUCK unit 20 via the input buses 285 and 286. That input data is operated upon to form a result in the registers generally indicated as 24, 25, 28 and 29. Thereafter data in the registers 24 through 29 is gated through one or more of the other functional units 18, 19, 30, 32 to form a result in the R register 34. Additionally, the E-unit 10 includes as part of its control status triggers 141, an OP decoder 142 and various counters 143 for controlling timing within the data processing system. The OP decoder 142 is connected to receive the current instruction being processed from the instruction unit 8 at a time specified by the counters 143 provided an appropriate trigger 141 indicates that a condition code determination should be made in the current processing cycle. Those triggers 141, decoder 142 and counters 143 are operative to set appropriate control triggers 145 for controlling, via lines 146, the comparison to be carried out by the operand comparator 274 in the LUCK unit 20. If the comparison of the operands input to the LUCK unit 20 indicates that the condition code is to be set to indicate a branch, an output signal from comparator 274 is supplied via lines 147 to the I-unit 8 where that signal causes the instruction processing controls to make the correct condition code dependent decision.

The LUCK unit 20 is operative to carry out logical operations, comparisons, counts and checking functions on operands OP2 and OP1 input on 32-bit buses 285 and 286, respectively. Unit 20 generally includes five or more levels of logic and a plurality of data paths with outputs representing the indicated functions. The first level (I) of logic includes conventional phase-splitters 266 and 267 which form bipolar output signals to logic blocks 270 and 271 from the unipolar input signals on buses 285 and 286.

Logic block 270 is operative to perform EXCLUSIVE-OR functions on the input operands providing an output on bus 283 and an input to comparator 274. Logic block 271 is operative to perform EXCLUSIVE-NOR functions on the input operands providing on its output an input to the operand comparator 274.

Operand Comparator

Figure 2:
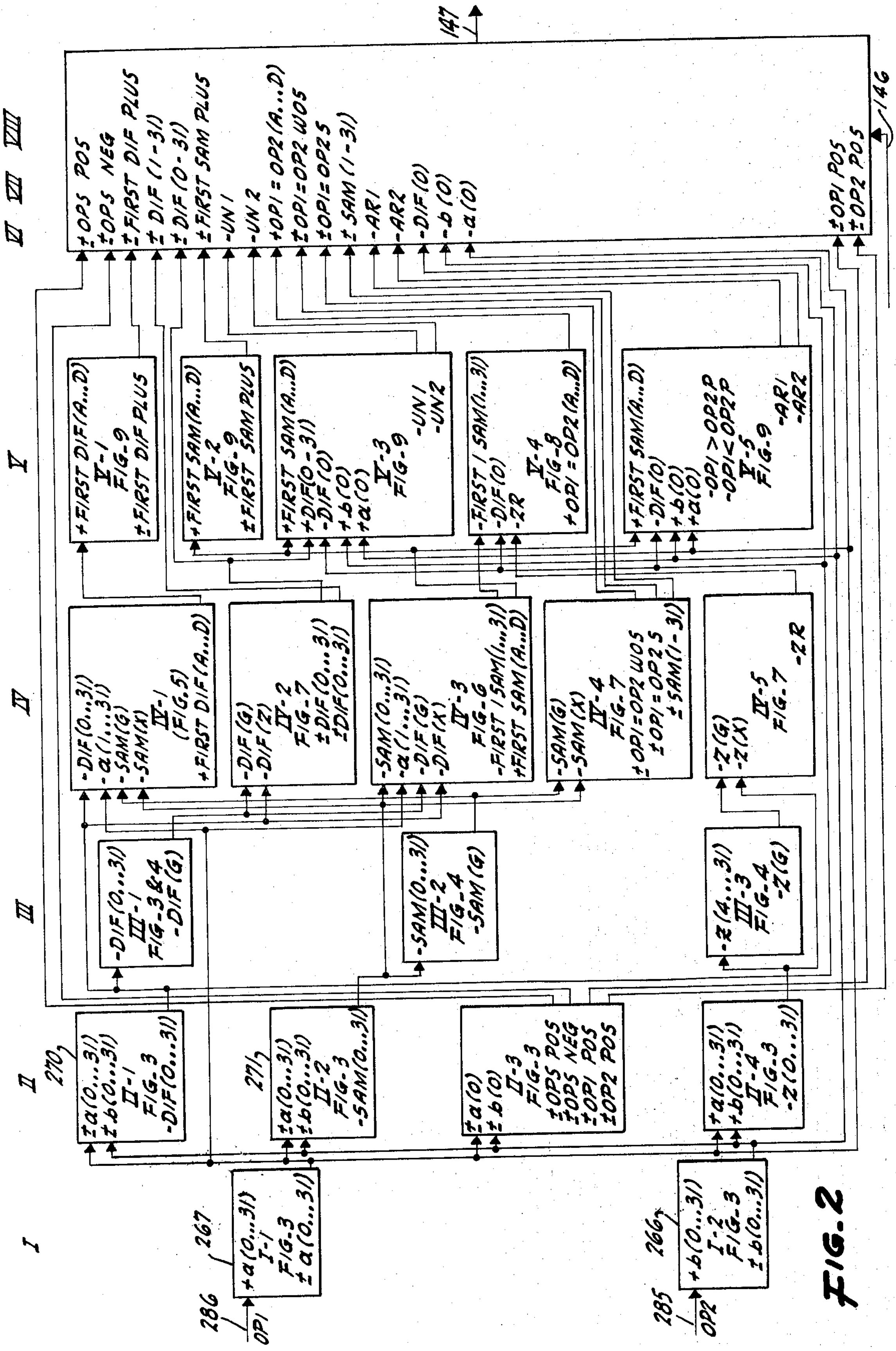
FIG. 2 depicts a block diagram of the operand comparator of the present invention organized by logic block levels I, II, III, IV, V, VI, VII and VIII.

The operand comparator 274 in FIG. 1 performs comparisons on OP1 input on bus 286 and OP2 input on bus 285. In FIG. 2, the operand comparator of the present invention is shown including the phase splitters 266 and 267 and the logic blocks 270 and 271 of FIG. 1. The phase splitters 285 and 286 and EXCLUSIVE OR/NOR circuits 270 and 271 are considered part of the operand comparator of the present invention but they may also be considered as separate units providing necessary inputs to the comparator 274 and other circuitry of FIG. 1.

In FIG. 1, the operand comparator receives additional inputs on bus 146 from the control triggers 145 and the timing and control circuitry 924. The bus 146 determines criteria derived from a decode of the operation code of the instruction currently being processed by the LUCK unit 20 and establishes criteria for specifying the particular comparison to be performed by the operand comparator. The operand comparator determines whether or not the input operands on buses 285 and 286 are greater than, less than, or equal to each other and determines whether or not an overflow condition will exist if an addition or substration is specified. The results of the comparison are output on lines 147 from comparator 274. Those lines carry the four signals condition code valid (CCV), condition code equal to 0 ($CC=0$), condition code equal to 1 ($CC=1$) and condition code equal to 3 ($CC=3$). If the CCV signal is energized and none of the other three lines are energized, then by a default, the condition code equal to 2 ($CC = 2$) condition is implied. The condition code equal to 0 implies that OP1 equals OP2. The condition code equal to 1 implies that OP1 is less than OP2 in the COMPARE instruction and implies that the result is less than 0 in the ADD and SUBTRACT instructions.

The condition code equal to 2 implies that OP2 is less than OP1 in the COMPARE instruction and that the sum is greater than 0 in the ADD and SUBTRACT instructions. The condition code equal to 3 implies that an addition or subtraction is called for and that an overflow will result from the addition or subtraction. An overflow is defined as occurring when the carry into the sign bit is not the same as the carry out of the sign bit. The valve of the condition code is connected via lines 147 to the instruction unit 8 where it is utilized in the control of the processing of instructions. While these condition code settings are typical, condition code settings are in general utilized to indicate many different conditions within a data processing system as identified for example, in the above-referenced "IBM System/370 Principles of Operation".

Further details as to the processing of instructions in accordance with condition code setting may be obtained by reference to the above-identified application entitled CONDITION CODE DETERMINATION AND DATA PROCESSING SYSTEM which application is hereby incorporated by reference in the present specification for the purpose of teaching the use of condition codes set by an operand comparator in controlling the processing of branch instructions.

In the system of FIG. 1, for fixed point arithmetic, positive numbers are in binary notation and negative numbers are in 2's complement binary notation where the high-order bit denotes the sign. For floating point arithmetic, the high-order bit denotes the sign, the next seven bits from high-order to low-order denote an exponent and the remaining 24 bits denote a fraction. In the operand comparator of the present invention, the fractions of floating point operands are normalized on a hexadecimal digit basis to eliminate all high-order hexadecimal 0's.

Comparator Logical Functions

The logical functions performed by the comparator of FIG. 2 are described in connection with the following TABLES I through IV. In those tables, the operands OP1 and OP2 are compared on a bit-by-bit basis. Each bit in OP1 is compared with the corresponding bit in OP2 in an order proceeding from the high-order bit toward the low-order bit. The comparisons are carried out in accordance with a number of rules which are specified in the following tables.

First considering fixed point arithmetic, under the conditions where the operands OP1 and OP2 are either both positive or both negative, the rules of comparison are summarized in TABLE I as follows:

Referring to TABLE I, the column labelled FIRST "DIFF" BIT POSITION signifies whether or not any condition of inequality (i.e., "DIFF" or difference meaning non-identity) is detected in the bit-by-bit comparison of the first and second operands input to the circuitry of FIG. 2. The "FIRST" bit position in which an inequality exists is that position determined by commencing with the highest-order bit and proceeding toward the lowest-order bit making a bit-by-bit comparison for equality.

The column labelled OP1 signifies whether or not the operand OP1 is positive (Pos) or negative (Neg) and whether or not the first "DIFF" bit for OP1 is a 1 or a 0 as indicated by the postscrips 1 or 0 for cases 3 through 6.

The column OP2 signifies the same information for the second operand OP2 as does the OP1 column for the first operand.

The column COMP signifies the relationship between (OP1) and (OP2) when the conditions in each of the previous three columns is existent. The comparison relationship of OP1 and OP2 is a magnitude comparison.

The column CIRCUIT identifies the particular circuit block of FIG. 2 which performs the comparison indicated.

Referring specifically to cases 1 and 2 in TABLE I, the conditions indicated are that each bit in OP1 is identical to the corresponding bit in OP2. Under these conditions for either both positive or both negative operands, OP1 is equal to OP2.

In TABLE I, cases 3 and 4, the conditions indicated are that both operands are positive. When both operands are positive the first bit position in the equality determination where the first inequality occurs controls which operand is greater. Specifically, that operand which has a 1 in the first inequality position is greater than the other operand which has a 0 in the coresponding bit position.

In TABLE I, cases 5 and 6, the conditions indicated are that both operands are negative. The operand having the 0 in the first inequality location is greater than the other operand which has 1 in the corresponding bit position.

Still considering fixed point arithmetic, under the conditions where the operands OP1 and OP2 are of opposite sign (i.e. one positive and one negative), the rules of comparison are summarized in TABLE II as follows:

TABLE I (Both Positive or Both Negative Operands)

| | FIRST "DIFF" BIT POSITION | OP1 | OP2 | COMP | CIRCUIT |
|---|---|---|---|---|---|
| Case 1 | None | Pos | Pos | OP1 = OP2 | IV-4 (2nd) |
| Case 2 | None | Neg | Neg | OP1 = OP2 | IV-4 (2nd) |
| Case 3 | Yes | Pos-1 | Pos-0 | \|OP1\|>\|OP2\| | VI- (4th) |
| Case 4 | Yes | Pos-0 | Pos-1 | \|OP1\|<\|OP2\| | VI- (3rd) |
| Case 5 | Yes | Neg-1 | Neg-0 | \|OP1\|<\|OP2\| | VI- (3rd) |
| Case 6 | Yes | Neg-0 | Neg-1 | \|OP1\|>\|OP2\| | VI- (4th) |

TABLE II (One Positive and One Negative Operand)

| | FIRST "SAME" BIT POSITION | ALL LOWER ORDER BITS | OP1 | OP2 | COMP | CIRCUIT |
|---|---|---|---|---|---|---|
| Case 1 | None | | Pos | Neg | \|OP1\|<\|OP2\| | VI-(9th) |
| Case 2 | None | | Neg | Pos | \|OP1\|>\|OP2\| | VI-(10th) |

TABLE II – Continued (One Positive and One Negative Operand)

| | FIRST "SAME" BIT POSITION | ALL LOWER ORDER BITS | OP1 | OP2 | COMP | CIRCUIT |
|---|---|---|---|---|---|---|
| Case 3 | 0 | | Pos | Neg | \| OP1 \| < \| OP2 \| | VI-(11th) |
| Case 4 | 0 | | Neg | Pos | \| OP1 \| > \| OP2 \| | VI-(12th) |
| Case 5 | 1 | | Pos | Neg | \| OP1 \| > \| OP2 \| | V-3-(1st) |
| Case 6 | 1 | | Neg | Pos | \| OP 1 \| < \| OP2 \| | V-3-(2nd) |
| Case 7 | 1 | 0 | Pos | Neg | \| OP1 \| = \| OP2 \| | VI-(0th) |
| Case 8 | 1 | 0 | Neg | Pos | \| OP1 \| = \| OP2 \| | VI-(0th) |

In considering TABLE II, the positive operand (POS) is in straight binary notation and the negative operand (NEG) is in 2's complement notation. As before, the operands are compared for equality on a bit-by-bit basis with the order running from the highest order bit toward the lowest order bit. While the order of comparision is logically from high to low the actual comparison is preferably carried out in parallel and simultaneously on a time basis. In the case of TABLE II, the comparison is carried out in order to detect the first identity (both 1's or both 0's) as indicated by the column FIRST "SAME" BIT POSITION.

Referring to TABLE II, cases 1 and 2 represent the conditions where none of the bits in corresponding positions are the same. Under these conditions, the absolute value of the positive operand is less than the absolute value of the negative operand.

Referring to cases 3 and 4 in TABLE II, the conditions indicated are that the first position having identical bits is one in which those bits are 0's. Under those conditions, the absolute value of the positive operand is less than the absolute value of the negative operand.

Referring to cases 5 and 6 in TABLE II, the conditions indicated are that the first position having identical bits is one in which those bits are 1's. Under those conditions, the absolute value of the positive operand is greater than or equal to the absolute value of the negative operand.

Referring to cases 7 and 8 in TABLE II, the conditions indicated are that the first position having identical bits is one in which those bits are 1's with the further conditions that all lower order bits following that 1 are 0's. Under those conditions, the positive and negative operands are equal.

Now considering normalized floating point arithmetic, the rules of comparison are the same as those given above in TABLE I for positive operands with the exception that the first bit in each floating point operand must be treated separately since that bit is the sign bit. The comparison is valid for the first seven bits specifying the exponent as well as being valid for the remaining twenty-four bits specifying a fraction. No consideration is required as to whether a fraction or exponent bit is the first difference bit position detected in the equality search.

In summary, the operand comparison circuitry 274 functions to compare the magnitude of OP1 and OP2 for both normalized floating point and fixed point arithmetic and for positive and negative operands employing the same general rules of comparison. Note that the search for equality (identity) used in connection with the TABLE II operations is the inverse of the search for equality (non-identity) used in connection with the TABLE I operations.

In addition to the magnitude comparison discussed in connection with TABLE I and TABLE II, the operand comparator of FIG. 2 also functions to detect overflow conditions in connection with the addition and subtraction of operands without actually adding or subtracting the operands. An instruction which specifies operations with two operands will produce a sum in the case of addition or a difference in the case of subtraction which exceeds the capacity of the data processing system.

While one way to detect whether or not an overflow occurs is to actually execute the specified instruction and then detect whether in fact an overflow occurs, a preferred method, in accordance with the present invention, is carried out by a comparison of the operands and a decode of the operation code of the add or substract instruction.

The format rules in a typical system for the operands is the same as previously described in connection with TABLE i and TABLE II. In fixed point arithmetic, positive numbers are in binary notation and negative numbers are in 2's complement notation. The first, or higher-order, bit is the sign bit which is 0 for positive and 1 for negative numbers.

The overflow detection is first described in connection with addition where operands OP1 and OP2 are added in accordance with an instruction. Operands OP1 and OP2 are input to the comparator of FIG. 2 and the rules of operation in the case of addition are summarized in TABLE III as follows:

TABLE III (Addition Overflow)

Figure 10:
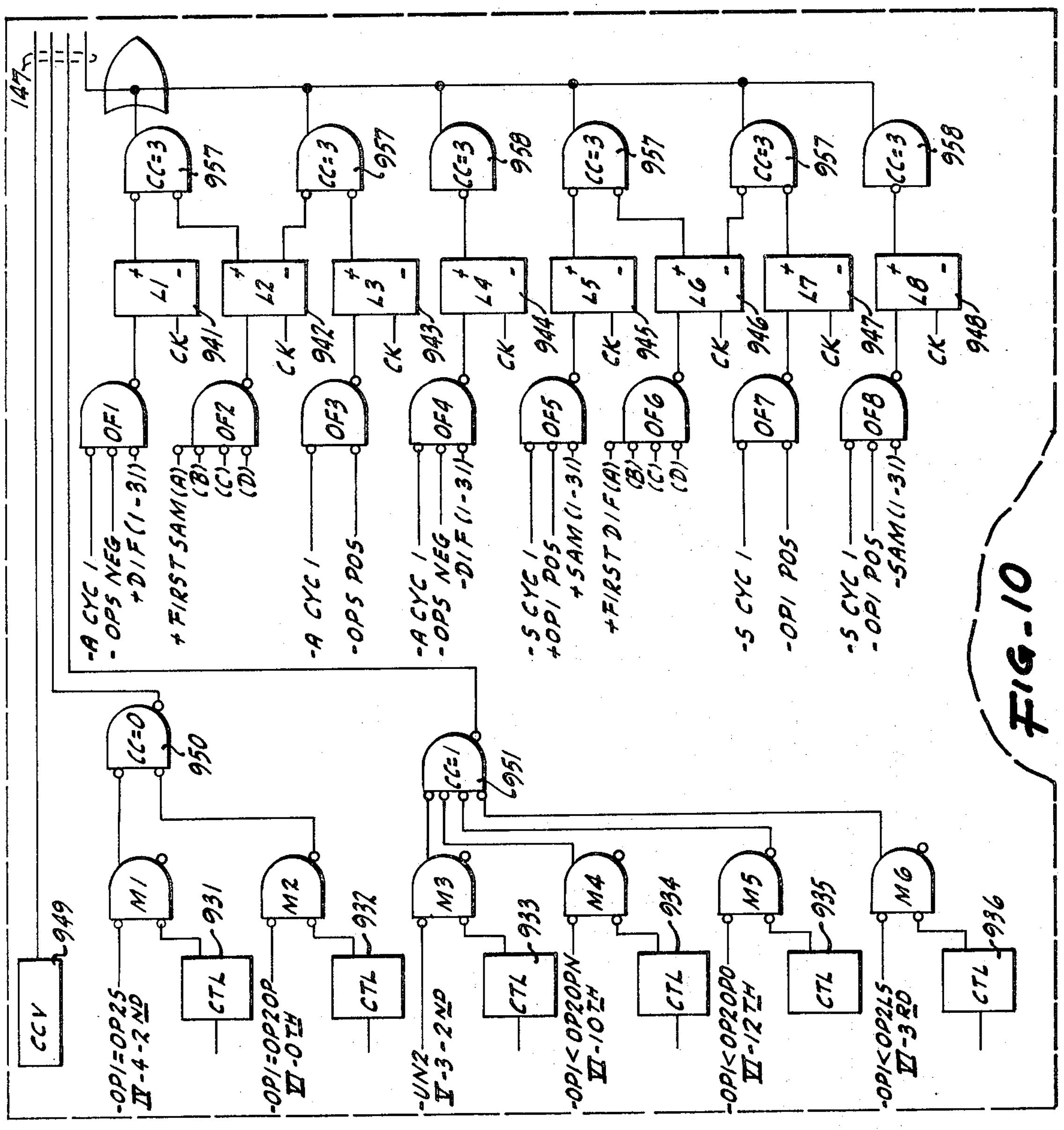
FIG. 10 depicts schematic representations of output circuits within blocks VI, VII, and VIII of the FIG. 2 circuitry.

| | FIRST "SAME" BIT POSITION | OP1 | OP2 | CC = 3 OVERFLOW | FIG. 10 LATCH |
|---|---|---|---|---|---|
| Case 1 | None | Pos | Pos | No | |
| Case 2 | 0 | Pos | Pos | No | |
| Case 3 | 1 | Pos | Pos | Yes | L2/L3 |
| Case 4 | None | Neg | Neg | Yes | L4 |
| Case 5 | 0 | Neg | Neg | Yes | L1/L2 |
| Case 6 | 1 | Neg | Neg | No | |
| Case 7 | None, 1, 0 | Neg | Pos | No | |
| Case 8 | None, 1, 0 | Pos | Neg | No | |

In TABLE III, the operands OP1 and OP2 are compared for the equality relationship of identity on a bit-by-bit basis running from the highest-order bit toward the lowest-order bit. The column labelled FIRST "SAME" BIT POSITION signifies whether or not a bit in one operand is the same (identity) as the corresponding bit in the other operand.

In case 1, the equality relationship of identity is not detected in any corresponding bit positions and with both operands positive, no overflow condition exists.

In case 2, the equality relationship of identity for the first corresponding bits detected is 0's and with both operands positive, no overflow exists.

In case 3, the first identity bits are 1's and with both positive operands, an overflow condition is detected.

In case 4, no identity is found in corresponding bits and with both negative operands, an overflow condition exists.

In case 5, the first identity bits are 0's and with both negative operands, an overflow exists.

In case 6, the first identity bits are 1's and for both negative operands, no overflow condition exists.

In cases 7 and 8, under any equality relationship for one negative and one positive operand, no overflow condition exists.

The overflow detection by the comparator of FIG. 2 for subtraction of OP2 from OP1 is carried out in accordance with the rules summarized in the following TABLE IV:

TABLE IV (Subtraction Overflow)

| Case | FIRST "DIFF" BIT POSITION | OP1 | OP2 | OVERFLOW | FIG. 10 LATCH |
|---|---|---|---|---|---|
| 1 | None | Pos | Neg | Yes | L8 |
| 2 | None | Neg | Pos | No | |
| 3 | Yes | Pos-1 | Neg-0 | Yes | L6/L7 |
| 4 | Yes | Pos-0 | Neg-1 | No | |
| 5 | Yes | Neg-1 | Pos-0 | No | |
| 6 | Yes | Neg-0 | Pos-1 | Yes | L5/L6 |
| 7 | Yes | Pos | Pos | No | |
| 8 | Yes | Neg | Neg | No | |

The comparison of operands OP1 and OP2 is carried out with a bit-by-bit comparison from higher-order bits to lower-order bits ignoring the higher-order sign bit. For substraction, the equality relationship sought is non-identity, that is, the first occurence of a difference between the corresponding bits in OP1 and OP2.

In case 1 of TABLE IV, the equality relationship is not found since none of the corresponding bits exhibit a difference and under the conditions where OP1 is positive and OP2 is negative, an overflow condition exists.

In case 2, no difference is found, the equality relationship of non-identity does not exist and with OP1 negative and OP2 positive, no overflow condition exists.

In case 3, the equality relationship is found with a positive 1 for OP1 and a negative 0 for OP2 which produces an overflow condition.

In case 4, the equality relationship is found with a positive 0 for OP1 and a negative 1 for OP2 which does not produce an overflow condition.

In case 5, the equality relationship is found with a negative 1 for OP1 and a positive 0 for OP2 which does not produce an overflow condition.

In case 6, the equality relationship is found with a negative 0 for for OP1 and a positive 1 for OP2 which produces an overflow condition.

In case 7, the equality relationship is found with both OP1 and OP2 positive which does not produce an overflow condition.

In case 8, the equality relationship is found with both OP1 and OP2 negative which does not produce an overflow condition.

TABLES I, II, III and IV define the logical comparisons performed by the operand comparator circuitry 274 of FIGS. 1 and 2. The comparisons, whether for magnitude comparison or overflow determination, employ a common comparison technique. That technique is a bit-by-bit comparison of the bit positions of each operand to detect a pre-determined equality relationship. The equality relationship is the first identity or non-identity in corresponding bits examined from higher-order toward lowerorder. The criteria for interpreting the comparison of the operands is given in the above four tables. The criteria are the signs of the operands (positive or negative), the type of arithmetic (floating point or fixed point), the value (1 or 0) of the first bit position having the identity relationship, and the nature of the operation to be executed (add, substract, compare, etc.).

Comparator Apparatus

Referring to FIG. 2, a schematic representation of an operand comparator in accordance with the present invention is shown. The comparator in FIG. 2 includes eigher levels of logic, I through VIII. In level I, the phase splitters 266 and 267 correspond to the like-numbered phase splitters in FIG. 1. The phase splitters receive the two 32 bit input buses 285 and 286, respectively. Operand 1 (OP1) is input on bus 286 and comprises the 32 bits $+a(0)$, $+a(1)$, . . . , $+a(31)$ designated as $+a(0\ldots31)$ in block I-1. The block I-1 includes 32 phase splitters, one for each of 32 inputs, which produce the 32 pairs of bipolar outputs $\pm a(0)$, $\pm a(1)$, . . . , $\pm a(31)$ which are deisgnated $\pm a(0\ldots31)$.

In a similar manner, the block I-2 receives the 32 inputs $+b(0)$, $+b(1)$, . . . , $+b(31)$ which are designated $+b(0\ldots31)$ and produces the 32 pairs of bipolar outputs $\pm b(0)$, $\pm b(1)$, . . . , $\pm b(31)$ which are designated $\pm b(0\ldots31)$.

Figure 3:
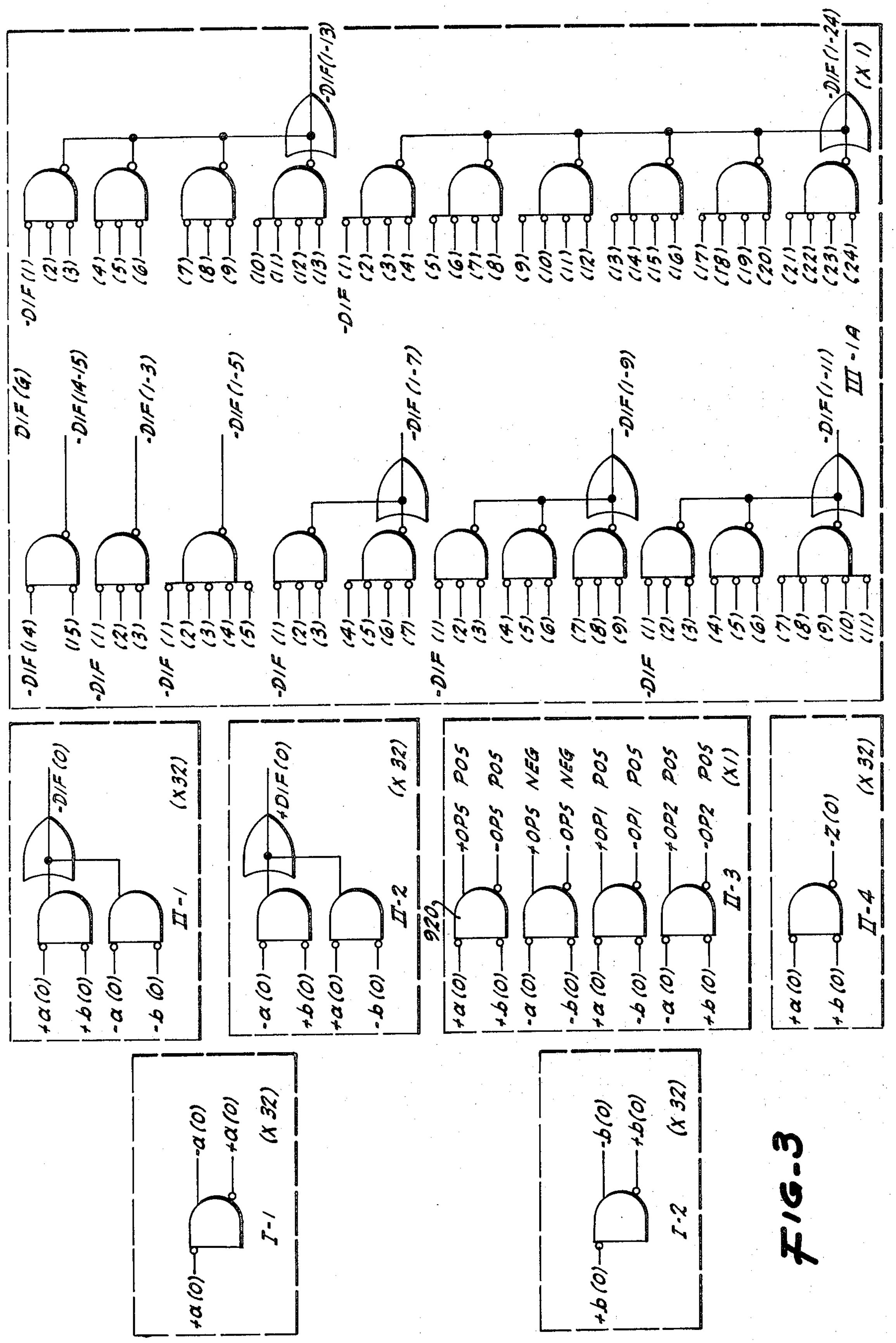
FIG. 3 depicts schematic representations of circuits within blocks I, II, and III of the FIG. 2 circuitry.

In FIG. 3, the blocks I-1 and I-2 are shown in further detail in connection with a typical single bit position, bit 0. In FIG. 3, the $+a(0)$ input forms the $-a(0)$ and the $+a(0)$ outputs. The 0 bit is typical of the 32 bits as indicated by the "X32" in the lower right hand corner of blocks I-1 and I-2. The $+b(0)$ input is similarly phase split to form the bipolar outputs $-b(0)$ and $+b(0)$ or simply $\pm b(0)$.

Referring again to FIG. 2, the outputs from each of the blocks I-1 and I-2 connect as inputs to the blocks II-1 through II-4 in the second level (II) of logic.

In FIG. 2, logic block II-1 forms the EXCLUSIVE-OR's of corresponding bits of OP1 and OP2. The inputs $\pm a(0\ldots31)$ and $\pm b(0\ldots31)$, derived from the level I logic, form the 32 output signals $-$DIF(0 . . . 31).

Referring to FIG. 3, the I-1 circuit shown for bit 0 is typical of the 32 EXCLUSIVE-OR circuits. The inputs $\pm a(0)$, $+b(0)$, $-a(0)$, and $-b(0)$ are combined forming the EXCLUSIVE-OR output $-$DIF(0). The $-$DIF(0) output is a 1 if the input bits $+a(0)$ and $+b(0)$ of operands OP1 and Op2 are the same and is a 0 if they are different.

Referring to FIG. 2, the block II-2 forms the EXCLUSIVE-NOR of the input operands on a bit-by-bit basis to form the 32 outputs $-$SAM(0 . . . 31).

Referring to FIG. 3, the block II-2 shows a typical EXCLUSIVE-NOR circuit for bit 0. The inputs $-a(0)$, $+b(0)$, $+a(0)$, and $-b(0)$ produce the output +DIF(0).

Referring to FIG. 2, block II-3 forms OR/NOR and AND/NAND combinations of the 0 bits of OP1 and OP2. Since and 0 bits are the sign bits, the outputs from block II-3 circuitry define the positive and negative sign relationships between OP1 and OP2.

Referring to FIG. 3, details of the sign bit comparisons of block II-3 are shown. Referring specifically to gate 920 as a typical gate, the input bits $+a(0)$ and $+b(0)$ form the outputs +OPS POS and $-$OPS POS. The gate 920 performs the logic functions of a NOR/OR gate for positive input signals. Alternatively, gate 920 can be characterized as performing the logical functions of a NAND/AND gate for negative input signals. Accordingly, gate 920 in forming the output signal +OPS POS performs the OR/NOR of ±*a*(0) and +*b*(0). Alternatively gate 920 can perform the AND/NAND of −*a*(0) and −*b*(0). The gate 920 is typical of the gates shown in connection with the present application. Each gate like gate 920 can be interpreted as a NOR/OR gate for positive inputs or as a NAND/AND gate for negative inputs. The logical functions are as indicated independent of the particular nomenclature preferred.

Referring to FIG. 2, the block II-4 performs 32 logical OR's on each of the corresponding bits 0 through 32 for OP1 and OP2 forming the 32 output signals −*Z*(0 . . . 31).

Referring to FIG. 3, the block II-4 is a typical one of the 32 bits, particularly bit 0. The inputs +*a*(0) and +*b*(0) produce the OR output −*Z*(0). The output −*Z*(0) is a 1 if either of the inputs is not 0.

Referring to FIG. 2, the blocks III-1, III-2, and III-3 form logical AND's of groups of the outputs from the level II circuits. Specifically, the block III-1 logically combines groups of the signals −DIF(0 . . . 31) to form the group difference signals −DIF(G) as shown in detail in FIGS. 3 and 4.

Figure 4:
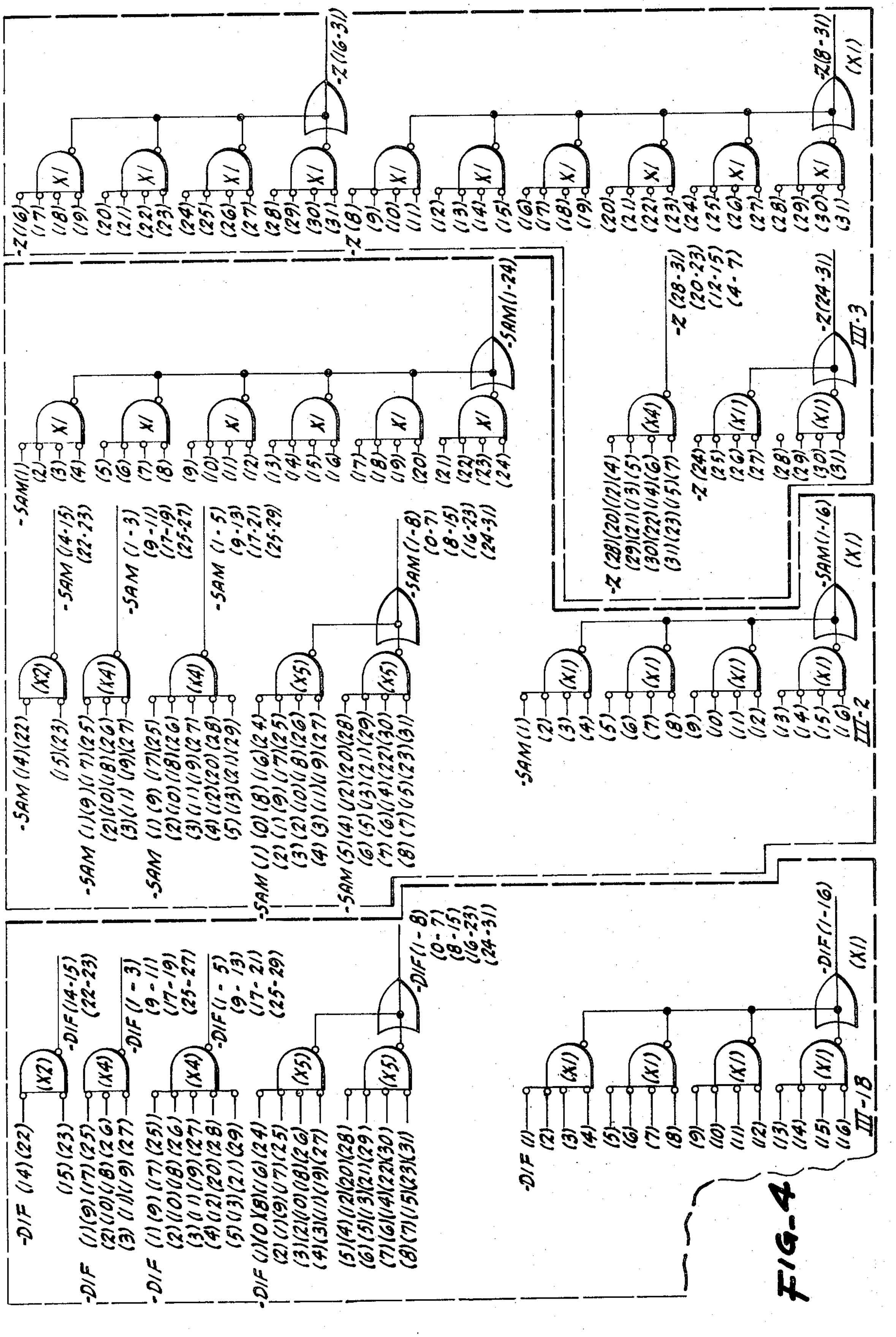
FIG. 4 depicts a schematic representation of circuits within block III of the FIG. 2 circuitry.

Referring to FIG. 3 and block III-1A and referring to FIG. 4 and block III-1B, a typical circuit is now described. Referring to the circuit having the inputs −DIF(14) and −DIF(15), that circuit produces the logical NAND of those signals forming the output − DIF(-14–15). Each of the other circuits in block III-1A is employed once (X1) to form the indicated NAND outputs. In FIG. 4 and block III-1B, some of the circuits are employed a multiple number of times. For example, the circuitry having the inputs −DIF(14) and −DIF(15) in circuit block III-1B produces the NAND output −DIF(14–15). As indicated by the symbol (X2) that circuit is also duplicated having the inputs −DIF(22) and −DIF(23) which are NAND'ed to form the output −DIF(22–23). In a similar manner, the second circuit from the top in block III-1B of FIG. 4 is duplicated four times (X4). The first use of that circuit is with the inputs −DIF(1), −DIF(2), and −DIF(3) which are NAND'ed to produce the output −DIF(1–3). That circuit is employed a second, third and fourth times until in the fourth use the inputs are −DIF(25), −DIF(26), −DIF(27) to produce the NAND'ed output −DIF(-25–27).

Referring again to FIG. 2, the block III-2 performs the NAND of groups of the signals −SAM(0 . . . 31) derived from block II-2. The outputs from block III-2 are the group AND signals −SAM(G) which are shown in FIG. 4. In FIG. 4, the block III-2 the circuits are again duplicated as shown.

Referring to FIG. 2, block III-3 forms the groups NAND's of combinations of the signals −Z(0 . . . 31) derived from block II-4. The details of the III-3 circuitry are shown in FIG. 4.

Referring to FIG. 2, the level IV logic includes the blocks IV-1, IV-2, IV-3, IV-4 and IV-5. The IV-1 block AND's combinations of the −DIF(0 . . . 31), −*a*(1 . . . 31), −SAM(G) and −SAM(X) signals to form the four outputs +FIRST DIF(A . . . D). An output from block IV-1 indicates that the first bit position that there is a difference between corresponding bits in OP1 and OP2, OP1 has a 1 in that position (necessarily OP2 has a 0).

Figure 5:
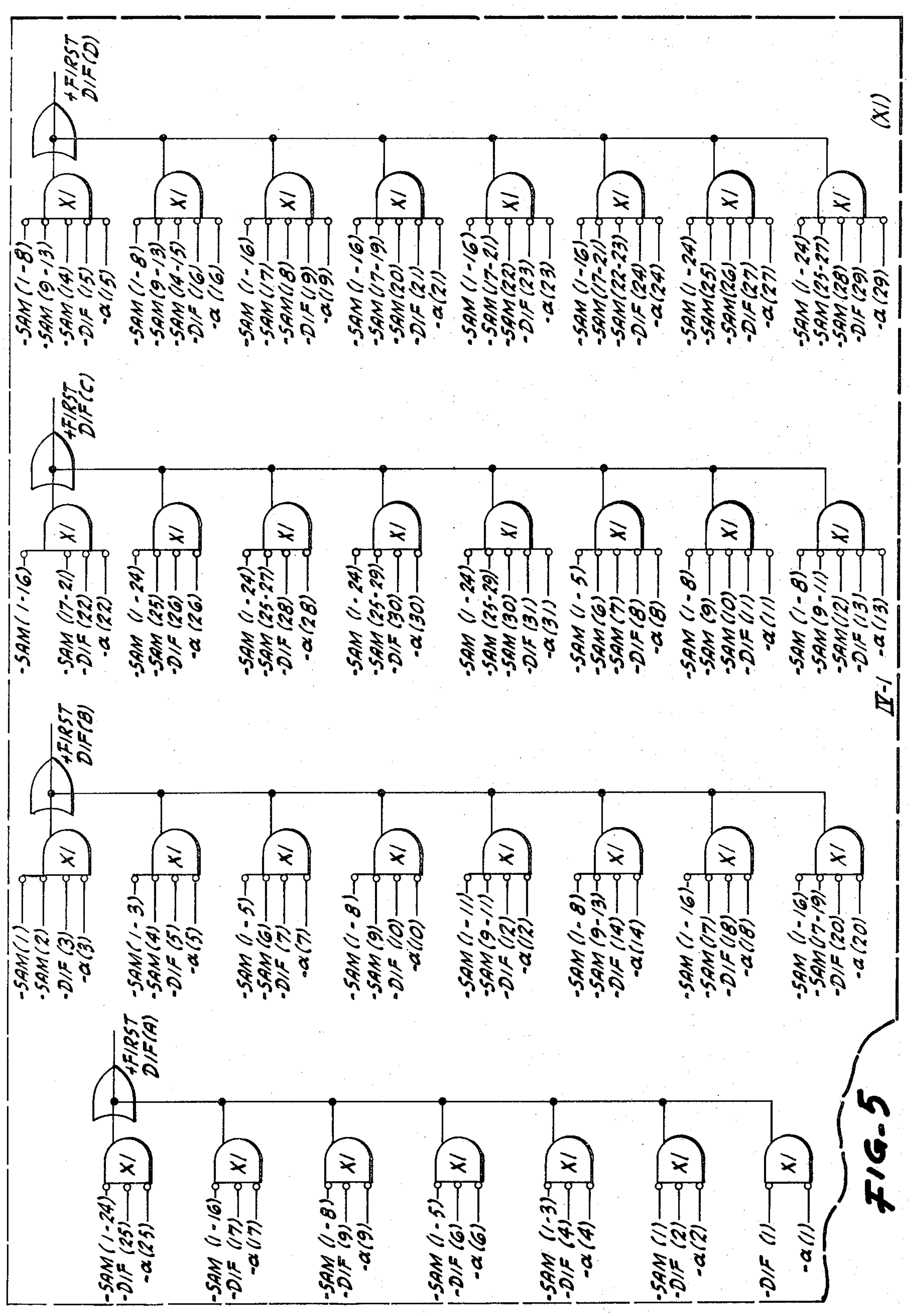
FIG. 5 depicts schematic representations of the circuits within block IV of the FIG. 2 circuitry.

Referring specifically to FIG. 5, block IV-1 includes four circuit groups which produce the outputs +FIRST DIF(A), +FIRST DIF(B), +FIRST DIF(C) and +FIRST DIF (D). When those four signals are in turn OR'ed together, a 1 signifies that the first difference bit position is a 1 in operand 1. Referring specifically to the circuits producing the output +FIRST DIF(A), seven AND gates have their outputs logically OR'ed. The gate having inputs −DIF(1) and −*a*(1) logically AND's those inputs to produce the output +DIF(1). When +DIF(1) is a 1, it signifies that bit 1 of operand 1 is a 1 when there is a difference between bit 1 of OP1 and OP2.

Still referring to FIG. 5, the gate having the inputs −SAM(1), −DIF(2), and −*a*(2) produces an output under the conditions that all higher-order bits from bit 2 (excluding the sign bit) are the same, there is a difference in corresponding bits 2 of OP1 and OP2, and bit 2 in operand 1 is a 1.

In FIG. 5, the gate with the inputs −SAM(1–3), −DIF(4), and −*a*(4) produces an output under the conditions that all high-order bits from bit 4 are the same, bit 4 in OP1 and OP2 are different, and bit 4 in operand 1 is a 1.

In a similar manner, the gates of block IV-1 having the inputs −*a*(17), and −*a*(25) are sensed to determine if there is a difference in those respective bits and if all highorder bits rspectively, excluding the sign bit, are the same. If any one of the seven indicated gates produces an output, the DOT OR produces an output energizing the signal +FIRST DIF(A).

In FIG. 5, the second column of gates functions for the bit positions 20, 18, 14, 12, 10, 7, 5, and 3 and produces an output signal at +FIRST DIF(B) if for any one of those bits the OP1 bit is a 1, all the high-order bits for both operands are the same and the corresponding bit position in OP2 is a 0. The four signals +FIRST DIF (A . . . D) together search all of the bits 1 through 31, so that a logical OR of those four signals indicates that, when energized the first place there is a difference it is a 1 in OP1. The circuitry of block IV-1 in FIG. 5 performs the first difference search required in connection with TABLE I and TABLE IV above.

Figure 7:
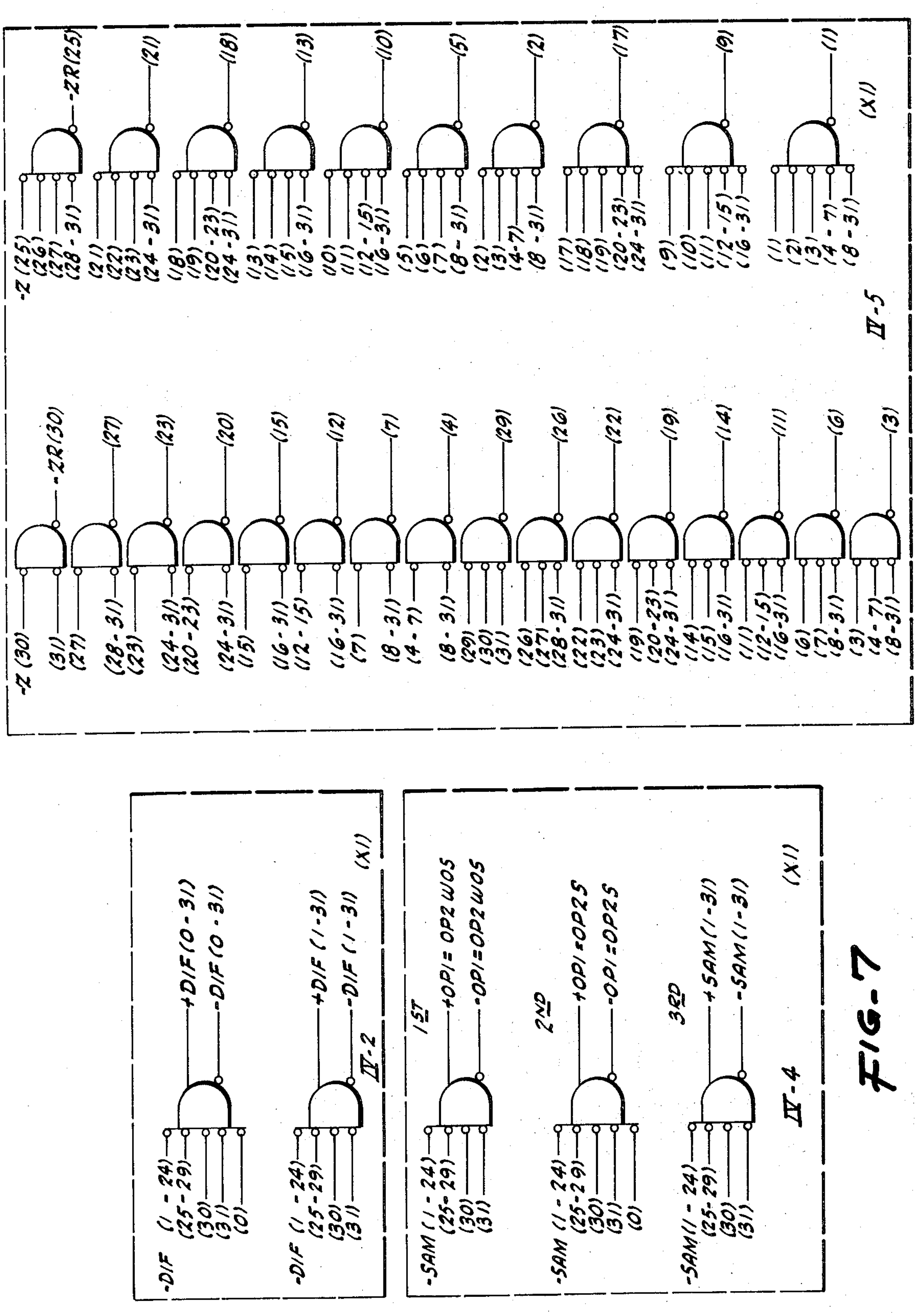
FIG. 7 depicts schematic representations of circuits within block IV of the FIG. 2 circuitry.

Referring again to FIG. 2, the block IV-2 receives the group AND signals −DIF(G) and selected ones of the individual −DIF(0 . . . 31) signals, designated as −DIF(X), to produce the output signals ±DIF(0–31) and ±DIF(1–31). The signals ±DIF(0–31) and ±DIF(-1–31) indicate that there is a difference in every bit position 0 through 31 and 1 through 31, respectively. The details of the IV-2 block are shown in FIG. 7. In FIG. 7, the inputs −DIF(1–34), −DIF(25–29), −DIF(30), −DIF(31), and −DIF(0) are logically AND'ed to form the output +DIF(0–31) and are logically NAND'ed to form the output −DIF(0–31). The outputs for bits 1 through 31 are formed in a similar manner except that the 0 bit input is not included to the AND/NAND gate.

Figure 6:
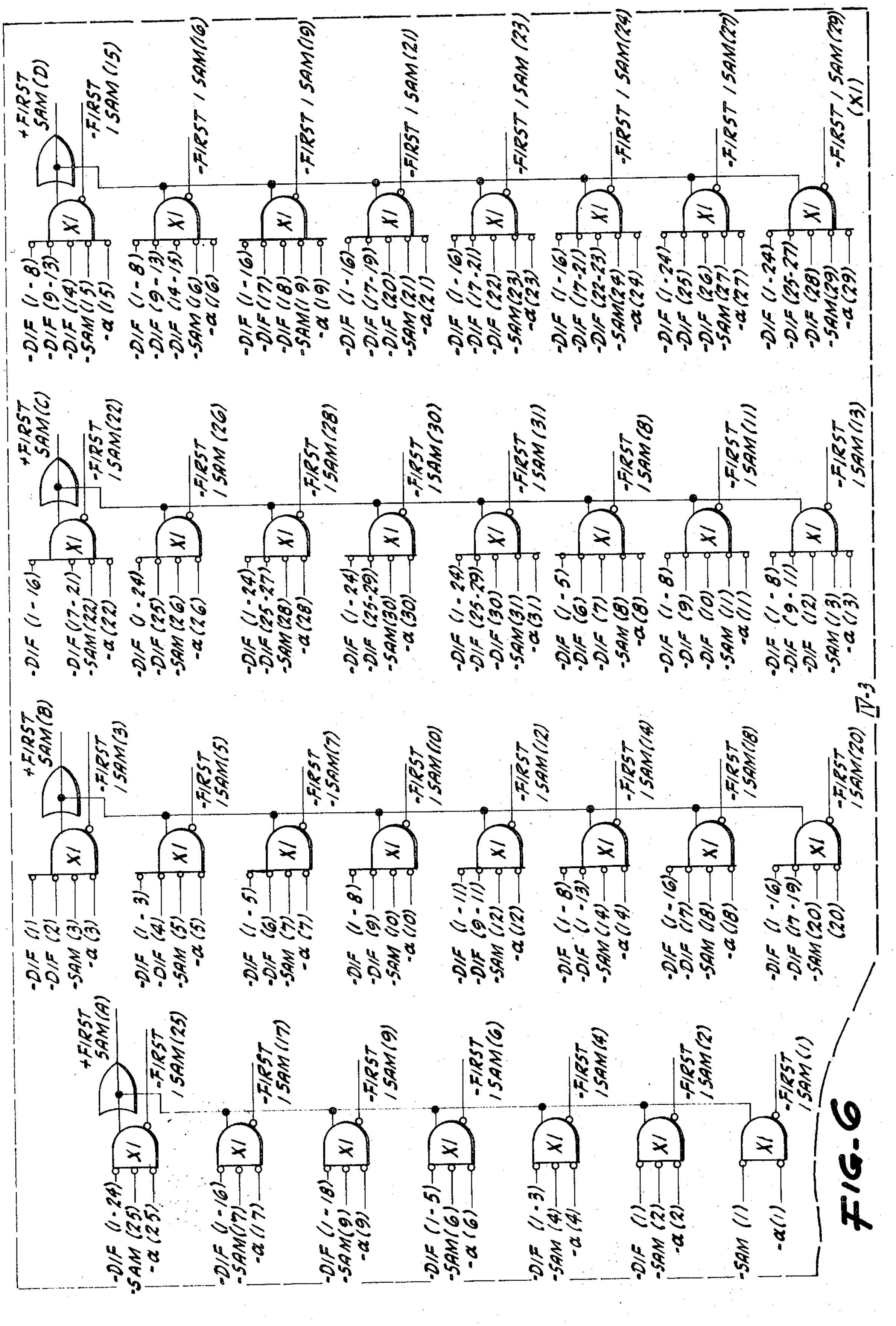
FIG. 6 depicts schematic representations of circuits within block IV of the FIG. 2 circuitry.

Referring to FIG. 2, the block IV-3 indicates when energized that the first bits which are identical in corresponding bit positions of OP1 and OP2 are 1's. The block IV-3 includes the inputs −SAM(0 . . . 31), −*a*(1 . . . 31), −DIF(G), and −DIF(X). The details of the IV-3 block are shown in FIG. 6 and are analogous to the IV-1 block previously explained. In FIG. 6, each bit position from 1 through 31 is examined for identity under the condition that all high-order bits, excluding the sign bit are different. The output from each bit position is OR'ed forming the four signals +FIRST SAM(A . . . D) which, when OR'ed signify if energized that the first same bit is a 1. The block IV-3 also produces the outputs −FIRST 1 SAM for each of the bit positions 1 through 31. For example, the −FIRST 1 SAM(25) output indicates that bit position 25 is the first same position.

The circuitry of block IV-3 in FIG. 6 performs the first same search required in connection with TABLE II and TABLE III above.

Referring to FIG. 2, the block IV-4 uses a combination of −SAM signals for all bits 0 through 31 or 1 through 31 for establishing identity relationships, with and without signs, for OP1 and OP2. Specfically, referred to FIG. 7, the 1st circuit of block IV-4, AND's and NAND's the inputs −SAM(1–24), −SAM(25–29), −SAM(30), and −SAM(31) to indicate the identity of OP1 and OP2 ignoring the high-order 0 bit. The 2nd circuit of block IV-4 performs the AND/NAND comparison additionally including the 0 bit. The 3rd circuit of IV-4 in FIG. 7 produces the same outputs as the first circuit indicating that all of the bits in operand 1 and operand 2 from 1 through 31 are identically the same and the third circuit is included in addition to the first because of power requirements. The circuit IV-4 (2nd) is used in connection with the conditions required in cases 1 and 2 of TABLE I above.

Referring to FIG. 2, block IV-5 receives inputs -Z(B) from the group NAND block III-3 and selected ones of the signals −Z(0 . . . 31) from the OR gates of block II-4. The function of the block IV-5 is to produce output signals −ZR which specify that all low-order bits, starting with different ones of corresponding bits in each operand, are 0's. Referring to FIG. 7, the details of block IV-5 are shown. As a typical gate, the gate having inputs −Z(3), −Z(4–7), and −Z(8–31) responsively NAND's those inputs and produces output −ZR3. The −Z(3) input indicates that in OP1 and OP2 both bits 3 are 0. The −Z(4–7) input indicates that all bits 4 through 7 in both operands are 0. The −Z(8–31) input indicates that all bits 8 through 31 in both operands are 0. The −ZR3 output indicates therefor that all of the bits 3 through 31 inclusive in both operands are 0's. In a similar manner, all of the other gates in block IV-5 of FIG. 7 produce signals which indicate that all low-order bits including the postscripted number up to bit 31, inclusive, are identically equal to 0 in both operands. The 0 condition of lower-order bits produced by the IV-5 circuitry is used in connection with cases 7 and 8 of TABLE II.

Referring to FIG. 2, the block V-1 receives the inputs +FIRST DIF(A . . . D) and OR/NOR's them to produce the outputs ±FIRST DIF PLUS. As indicated in block V-1 of FIG. 9 in detail, the function of block V-1 is to OR the input signals to form the output signals which indicate that the first difference in corresponding bits of OP1 and OP2 which exists from high-order to low-order is a 1 in OP1 and a 0 in OP2.

Referring to FIG. 2, block V-2 receives the four inputs +FIRST SAM(A . . . D) and OR/NOR's them to produce the outputs ±FIRST SAM PLUS. The OR/NOR operation is shown in detail in block V-2 of FIG. 9. The outputs ±FIRST SAM PLUS indicate that the first place from high-order to low-order where OP1 and OP2 have corresponding bits which are identical, the identity is a 1.

Figure 9:
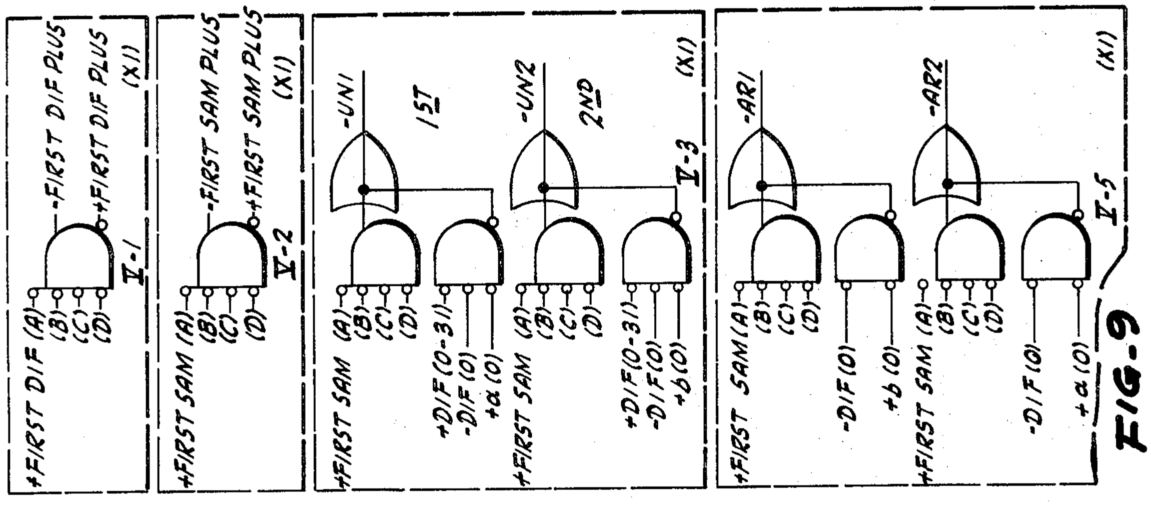
FIG. 9 depicts schematic representations of circuits within block V of the FIG. 2 circuitry.

Referring to FIG. 2, the block V-3 NOR's the inputs +FIRST SAM(A . . . D), +DIF(0-31), −DIF(0), +b(0), and +a(0) to form the outputs −UN1 and −UN2. The details of block V-3 are shown in FIG. 9 where the 1st circuit produces the −UN1 output and the 2nd circuit produces the −UN2 output. In the 1st circuit, the upper gate is a NOR which indicates that, if any same exists, the first same is a 1. The bottom gate is a NAND which indicates that not all bits 0 through 31 are different, +DIF(0–31), and that bit 0 is different, −DIF(0), and that OP1 is positive, +a(0). The −UN1 output is an OR of the negative outputs from the two gates and indicates that OP1 is greater than or equal to OP2 in absolute value. The circuit V-3-1st of FIG. 9 performs case 5 of TABLE II above. In a similar manner, the 2nd circuit of block V-3 in FIG. 9 indicates that OP2 is greater than or equal to OP1 in absolute value as indicated in connection with case 6 of TABLE II above.

Referring to FIG. 2, the block V-4 AND's the signals −FIRST 1 SAM(1 . . . 31), −DIF(0) and −ZR to form the outputs +OP1=OP2(A . . . D). The function of block V-4 is to which indicate, when the 0 bits are different (operands of opposite sign), and a first same is a 1, that all low-order bits from that first same bit position are 0's.

Figure 8:
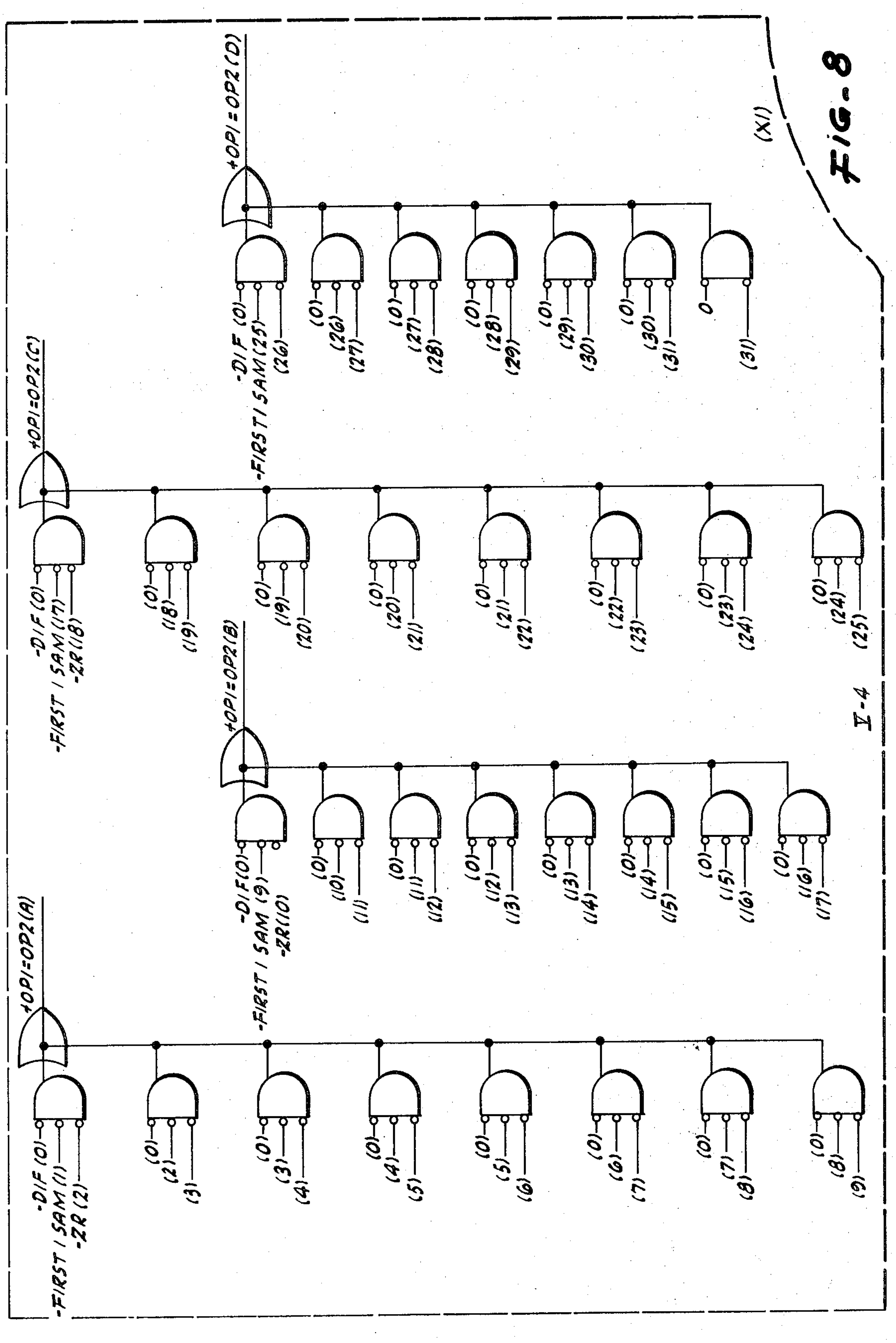
FIG. 8 depicts schematic representations of circuits within block V of the FIG. 2 circuitry.

Referring to FIG. 8, the details of block V-4 are shown as including four circuits which produce the four signals +OP1=OP2(A. . . D). The first gate associated with the first signal +OP1=OP2(A) is typical. That gate has the inputs −DIF(0), −FIRST 1 SAM(1), and −ZR(2). That gate performs the AND of those inputs indicating that the first bits 0 are different the first same bit is bit 1, and all low-order bits (bits 2 through 31) are 0's in both operands. The output of the first gate is OR'ed with the outputs of seven other AND gates to produce the first output +OP1=OP2(A). In a similar manner, each of the other three circuits in block V-4 combine in the same way to produce the four indicated signals +OP1=OP2(A . . . D) which when OR'ed as described in connection with FIG. 11 indicate that OP1 equals OP2.

Referring to FIG. 2, the block V-5 receives the inputs +FIRST SAM(A . . . D), −DIF(0), +b(0), and +a(0) to produce the outputs −AR1 and −AR2. The details of the block V-5 as shown in FIG. 9 where the -AR1 signal is produced by an OR of the negative outputs of two gates. The first gate is a NOR which indicates that the first same bit is a 1 bit. The second gate indicates that bit 0 is different and that bit 0 of OP2 is not a 1. The −AR2 signal is produced under the same conditions except that bit 0 of operand is not a 1.

Referring to FIG. 2, the level VI, VII and VIII circuitry receives inputs from the previous levels I through V to develop further equality relationships which are typically employed to set the condition code signals on the output lines 147. The details of block VI, VII and VIII of FIG. 2 are shown in FIGS. 10 and 11.

Figure 11:
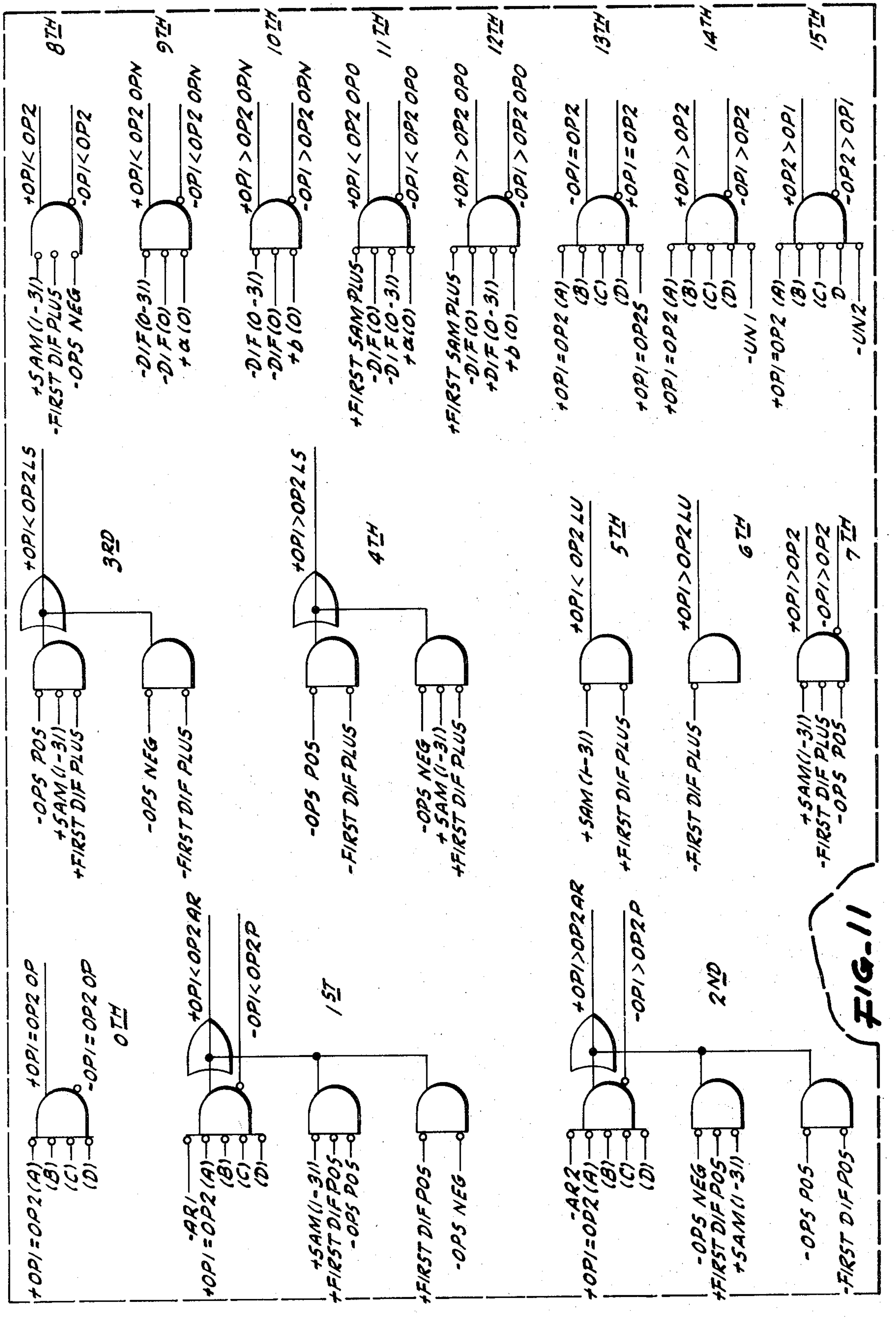
FIG. 11 depicts schematic representations of circuits in block VI of the FIG. 2 circuitry.

Referring to FIG. 11, 16 circuits are shown indicated as running from the 0th to 15th circuit. The circuits VI-4th represent the outputs for cases 3 and 6 of TABLE I above.

Referring in FIG. 11 specifically to the circuit VI-4th and case 3 of TABLE I above, the relationship of the absolute value of OP1 being greater than the absolute value OP2 results whenever an output signal +OP1 > OP2LS exist. That signal is produced in the crcuit VI-4th by the OR'ing of the outputs from two AND gates.

The first AND gate is energized whenever both operands are positive (—OPS POS) and the first difference is a 1 in OP1 (—FIRST DIF POS). The second AND provides an output signal whenever both operands are negative (—OPS NEG), whenever bits 1 through 31 are not all the same (—SAM(1-31)), and whenever the first difference is not a 1 in OP1 (+FIRST DIF POS). In the circuit VI-4th, the top gate is operative during case 3 of TABLE I while the bottom gate is operative during case 6 of TABLE I.

In a similar manner, the circuitry VI-3rd is operative during cases 4 and 5 of TABLE I.

Still referring to FIG. 11, the cases 1 through 4 in TABLE II are provided for by the circuits VI-9th, VI-10th, VI-11th, VI-12th, respectively. The cases 5 and 6 in TABLE II are provided for by the circuits V-3-1 and V-3-2, respectively, as previously described. The cases 7 and 8 in TABLE II are satisfied by the positive outputs of the circuits VI-0.

The other circuits VI-1st, VI-2nd, VI-5th, VI-6th, VI-7th, VI-8th, VI-13th, VI-14th and VI-15th in FIG. 11 represent other interesting equality relationships which may be derived in accordance with the present invention. The equality relationships of FIG. 11 are exemplary and are not intended to be exhaustive of all possibilities. Circuits VI-14th and VI-15th, for example, may be used to resolve the ambiguity of cases 5 and 6 of TABLE II, that is, whether the equality relationship exists or whether the greater than or less than relationship exists. As indicated in the circuits VI-14th and VI-15th, the absence of the case 7 and case 8 conditions of TABLE II are utilized to indicate that the inequality of cases 5 and 6 must be the controlling result.

Referring now to FIG. 10, the output circuitry 922 is part of the blocks VI, VII, and VIII of FIG. 2. Circuitry 922 receives inputs from block VI of FIG. 11 and from the other blocks in FIG. 2 to provide the outputs on the four lines 147. In particular, the magnitude control signals from the circuitry of FIG. 11 are input to the AND gates M1 through M6 in the manner indicated. Specifically, the output from the circuitry IV-4-2 and from the circuitry VI-0th from FIGS. 7 and 11, respectively, are input to the AND gates M1 and M2, respectively. Those inputs are AND'ed with the outputs from control circuits 931 and 932, respectively, to provide inputs to the OR gate 950. The gate 950 when energized provides an output signal which signifies that the condition code equals 0 (*CC*=0) line of the four output lines 147 is to be energized.

In a similar manner, the AND gates M3 through M6 combine control signals from controllers 932 through 936 with the outputs of the circuits V-3-2nd, VI-10th, VI-12th, and VI-3rd, respectively. The outputs from the AND gates M3 through M6 are OR'ed in gate 951 to produce the condition code equal 1 (*CC*=1) signal on one of the four lines 147.

The condition code valid (CCV) output also appears as one of the lines 147 and is produced by the circuitry 949 which is not pertinent to the present invention.

Still referring to FIG. 10, the latch circuits L1 through L8 function to store overflow conditions developed in the gates OF1 through OF8. The overflow conditions in the gates OF1 through OF8 correspond with those previously indicated in connection with cases 3, 4 and 5 in TABLE III and cases 1, 3 and 6 in TABLE IV.

Referring specifically to gate OF1 of FIG. 10 and to FIG. 1, the input —A CYC1 is derived from the control triggers 145 via line 146 in FIG. 1 specifying, as a decode of the operation code that an add instruction is being specified. The second input signifies that both OP1 and OP2 are negative and the third input signifies that there is not a difference in every bit position 1 through 31. The output from the gate OF1 is latched in the latch L1. The second gate OF2 provides an output whenever the first same position is a 1 bit. That signal is stored in L2 and is AND'ed in gate 957. The AND gate treats inputs as negative so that the input from L2 is a signal which indicates that the first same in corresponding bits of OP1 and OP2 is not a 1 and hence must be a 0. The combination of the OF2 and OF1 conditions satisfies the requirements of case 5 in TABLE III. In a similar manner, the combination of gates OF2 and OF3 satisfies the requirements of case 3 in TABLE III.

Still referring to FIG. 10, the gate OF4 satisfies the conditions of case 4 in TABLE III.

Still referring to FIG. 10 and referring to TABLE IV, gate OF6 produces an output that indicates that the first difference is a 1 in OP1 and the reciprocal that the first difference is a 0 in OP2. Gate OF5 in combination with gate OF6 when AND'ed after the latches L5 and L6 in gate 957 satisfies the condition of cse 3 in TABLE IV. Similarly, the combination of gates OF6 and OF7 satisfies the condition of case 3 in TABLE IV. Finally the gate OF8 satisfies the condition of case 1 in TABLE IV. The outputs from latches L4 and L8 through the inverters 958, together with the AND gates 957, are OR'ed to form the condition code equal 3 (*CC*=3) output which is one of the four outputs of lines 147.

Referring to FIG. 10, the various control signals generated by the controls 931 through 936 (which typically include latches like latches 941 to 948) and the latches 941 through 948 are derived in conjunction with the timing and control circuitry 924 of FIG. 1 and the output from the control triggers 146. In general, the clocking of the system of the present invention is carried out in accordance with the above-identified application entitled CLOCK APPARATUS AND DATA PROCESSING SYSTEM. The input signals on lines 285 and 286 are derived, as indicated in that above-referenced application, as the output from latch circuits (not shown) at one clock timing period and the information passes through the operand comparator of FIG. 2 and is stored at the next clock period in latches like latches L1 through L8 of FIG. 10, for example. Whether the latches are included as a part of or separate from the operand comparator of the present invention is a matter of designer's choice. If the comparison is not performable within the clocking period of the data processing system, then latch circuits are utilized to store data at an intermediate point of the comparison where necessary. The comparison is then completed in a second or subsequent clock period.

As discussed in detail in the above-referenced application CONDITION CODE DETERMINATION AND DATA PROCESSING SYSTEM, the operand comparator of the present invention is employed where it is desired to set the condition code at the end of the E1 cycle of the instruction processing unit. Accordingly, the timing and control signals in FIG. 10 and the input to the operand comparator of FIG. 2 in the system of FIG. 1 are operative generally during the two cycles prior to the E1 cycle, that is, during OB1 for operand buffer access initiation and OB2 for operand buffer access completion. Before or during that period, the operation code from the condition code setting instruction is decoded for setting the control triggers 145. Again referring to FIG. 10, the −A CYC1 signal indicating an addition and the −S CYC1 signal indicating a subtraction, and the other timing and control signals are input gates of FIG. 10 and are operative to enable the outputs on lines 147 at the completion of the E1 cycle.

Comparator Operation

An example of a comparison of two floating point operands in accordance with TABLE I, case 4, is given as follows where OP1 is $+ \frac{1}{2} \times 16^{-63}$ and where OP2 is $+ \frac{3}{4} \times 16^{-63}$:

```
OP1   0 0...01,   100...0,   0...0,   0...0
OP2   0 0...01,   110...0,   0...0,   0...0
               ↑—FIRST "DIFF"
```

The comparison of OP1 and OP2 commences with OP1 input on bus 286 and OP2 input on bus 285 of FIG. 2 where they are phase split in blocks I-1 and I-2 to provide inputs to the level II blocks.

In block II-1, the -DIF(9) circuit is energized indicating a difference in bit 9 of OP1 and OP2. None of the other circuits in block II-1 are energized. In block II-2, the −SAM(0 . . . 8) circuits and the −SAM(10 . . . 31) circuits are energized while the −SAM(9) circuit is not energized. In block II-3, the signal +OPS POS is energized since both OP1 and OP2 are positive as indicated by 0's in the high-order (left most) bits. In block II-4, the signals −Z(0 . . . 6) and the signals −Z(10 . . . 31) are energized indicating all 0's in all but bits 7, 8 and 9 of OP1 and OP2.

In block III-1, none of the group difference signals −DIF(G) are energized. In block III-2, the group signals −SAM(14–15), −SAM(22–23), −SAM(1–3), −SAM(17–19), −SAM(25–27), −SAM(1–5), −SAM(-17–21), −SAM(25–29), −SAM(1–8), −SAM(0–7), −SAM(16–23), and −SAM(24–31) are energized. In block III-3, the group signals −Z(28–31), −Z(20–23), −Z(12–15), −Z(24–31) and −Z(16–31) are energized. The group signal −Z(8–31) and −Z(4–7) which includes one or more of the bits 7, 8 and 9 are the only signals not energized.

In block IV-1, as shown in detail in FIG. 5, the AND gate with the inputs −SAM(1–8), −DIF(9), and $-a$(9) is the only one which is a candidate to be energized. That AND gate is not energized however, because the $-a$(9) signal is 0. Therefore, none of the signals +FIRST DIF(A), +FIRST DIF(B), +FIRST DIF(C) and "FIRST DIF(D) are energized. In block IV-2, none of the circuits are energized. In block VI-3, none of the circuits are energized. In block IV-4, none of the circuits are energized. In block IV-5, the signals −ZR(10 . . . 31) are energized.

In block V-1, the circuit is not energized because none of the circuits in block IV-1 were energized. In block V-2, none of the circuits are energized because none were energized in block IV-3. In block V-4, none of the circuits are energized.

Referring now to FIG. 11, the circuit VI-3rd is energized to produce a logical output +OP1 < OP2LS because the input −OPS POS from block II-3 and the input +FIRST DIF PLUS from block V-1 are simultaneously present. The output signal +OP1 < OP2LS is input to the gate M6 in FIG. 10. The output from gate M6 at the appropriate time determined by controller 936 satisfies the gate 951 to energize one of the output lines 147 which indicates that the *CC*=1 condition exists. The controller 936 for the typical floating point COMPARE instruction is energized during the E1 segment of that instruction.

In the following examples from TABLE II, TABLE III, and TABLE IV the operation of the operand comparator can be traced through the circuits of FIG. 2 in the same manner as done for TABLE I above.

A fixed point arithmetic example from TABLE II, case 4, is given where the 32-bit OP1 is −4 in 2's complement notation and the 32-bit OP2 is +2 in binary notation as follows:

```
OP1   1 1...1100
OP2   0 0...0010
             ↑—FIRST "SAME"
```

An example of TABLE III, case 3, for a fixed point addition instruction is given for OP1 having the value $+ 1.610612736 \times 10^9$ and for OP2 having the same value as follows:

```
OP1         0 110...0,   0...0,   0...0,   0...0
OP2         0 110...0,   0...0,   0...0,   0...0
             ↑—FIRST "SAME"
OP1 + OP2   1 100...0,   0...0,   0...0,   0...0
            ↑—OVERFLOW
```

An example of TABLE IV, case 6, for a fixed point substract instruction is given for OP2 having a value $+ 1.610612736 \times 10^9$ substracted from OP1 having a value $-2.147418113 \times 10^9$:

```
OP1         1 000...0,   0...0,   1...1,   1...1
OP2         0 110...0,   0...0,   0...0,   0...0
             ↑—FIRST "DIFF"
OP1 − OP2   1,0 010...0,   0...0,   1...1,   1...1
            ↑↑OVERFLOW
```

An overflow exists in the TABLES III and IV examples because the maximum negative number (32 0's) is $-2.147483648 \times 10^9$ and the maximum positive number is $+2.147483647 \times 10^9$.

While the invention has been particularly shown and described with reference to preferred embodiments thereof it will be understood by those skilled in the art that various changes in form and details may be made therein without departing from the spirit and the scope of the invention.

What is claimed is:

1. In a data processing system an operand comparator for comparing first and second operands comprising, first means for simultaneously comparing corresponding bits in the first and second operands to detect the first occurrence, from highest-order toward lowest-order, of a first equality relationship between corresponding bits, second means for simultaneously comparing corresponding bits in the first and second operands to detect the first occurrence, from highest-order toward lowest-order, of a second equality relationship between corresponding bits, and third means for selecting said first or second means whereby said first or second equality relationship is selected.

2. The comparator of claim 1 wherein, for operands in fixed point arithmetic, said first equality relationship is identity of bits when one of said operands is positive in binary notation and the other of said operands is negative in 2's complement notation and wherein said second equality relationship is non-identity of bits when both operands are positive in binary notation or both operands are negative in 2's complement notation.

3. The comparator of claim 1 wherein, for operands in normalized floating point arithmetic, said second equality relationship is non-identity of corresponding bits excluding the sign bits, and said third means selects said second means.

4. The method of comparing two operands in a data processing system comprising the steps of electronically comparing said first and second operands on a bit-by-bit basis to detect a first bit position, from highest-order toward lowest-order, having non-identity if said operands are in normalized floating point arithmetic, having non-identity if said operands are both positive or are both negative and are in fixed point arithmetic, and having identity if said operands are in fixed point arithmetic and one operand is positive and the other operand is negative.

5. In a data processing system operative for executing instructions and employing first and second operands in connection with the execution of instructions, said first and second operands including a plurality of ordered bits arrayed from highest-order to lowest-order, an operand comparator for comparing the first and second operands within the data processing system, said comparator formed by a plurality of electronic circuits for operating upon said operands on a bit-by-bit basis, said operand comparator comprising, first means including a plurality of levels of logic for simultaneously comparing corresponding bits in the first and second operands to detect the first occurrence, from highest-order toward lowest-order, of an identity relationship between corresponding bits in said first and second operands, second means including a plurality of levels of logic for simultaneously comparing corresponding bits in the first and second operands to detect the first occurrence, from highest-order toward lowest-order, of a non-identity relationship between corresponding bits in said first and second operands, and third means for selecting said first or second means to select said identity or non-identity relationship.

6. The comparator of claim 5 wherein for operands in fixed point arithmetic, said third means includes means for selecting said first means when one of said operands is positive in binary notation and the other of said operands is negative in 2's complement notation and wherein said third means includes means for selecting said second means when both operands are positive in binary notation or both operands are negative in 2's complement notation.

7. The comparator of claim 5 wherein, for operands in normalized floating point arithmetic, said third means includes means for selecting said second means where said equality relationship is non-identity of corresponding bits excluding the sign bits.

8. In a data processing system operative for executing instructions, said system including apparatus for fetching and storing first and second operands in connection with the execution of instructions, said first and second operands including a plurality of ordered bits defined by the signals $\pm a(0 \ldots n)$ and $\pm b(0 \ldots n)$, respectively, where $n$ equals the number of bits, a comparator formed by a plurality of electronic circuits comprising, a first logic level defining said operands as bipolar signals $\pm a(0 \ldots n)$ and $\pm b(0 \ldots n)$, respectively, a second logic level including means for forming the EXCLUSIVE-OR of said operands $\pm a(0 \ldots n)$ and $\pm b(0 \ldots n)$ on a bit-by-bit basis to form signals −DIF and including means for forming the EXCLUSIVE-NOR of the operands $\pm a(0 \ldots n)$ and $\pm b(0 \ldots n)$ on a bit-by-bit basis to form signals −SAM, a third logic level including means for combining groups of said signals −DIF and including means for combining groups of said signals −SAM, a fourth logic level including means for combining the signals from said first, second and third logic levels to form signals FIRST DIF which specify that the first difference from high-order to low-order between corresponding bits in said first and said second operands is a 1 in said first operand, and said fourth logic level further including means for combining the signals from said first, second and third logic levels to form signals FIRST SAM which specify that the first identity between the bits in said first and second operands is a 1.

9. The operand comparaor of claim 8 further comprising means for sensing the high-order bits of said first and second operands for detecting identity and providing a signal OPS POS when said high-order bits re both 0's and for providing a signal OPS NEG when said high-order bits are both 1's, means responsive to said SAM signals for indicating that the absolute value of said first operand equals the absolute value of said second operand providing a signal OP1 = OP2 S, means responsive to said OPS POS, said SAM and said FIRST DIF signals for specifying that the absolute value of said first operand is greater than or less than the absolute value of said second operand.

10. The operand comparator of claim 8 wherein said DIF signals include the signals DIF(0) for indicating that said first and second operands are of opposite signs, said comparator further including means responsive to said FIRST SAM signals and said DIF(0) signals for indicating the greater than and less than equality relationships between said first and said second operands.

11. The operand comparator of claim 10 further including means responsive to said FIRST SAM signals for detecting when all lower-order bits after the first identity bit which is a 1 are all 0's thereby specifying that the absolute value of said first operand is equal to the absolute value of said second operand.

12. In a data processing system operative for executing instructions, said system including apparatus for fetching and storing first and second operands in connection with the execution of instructions, said first and second operands including a plurality of ordered bits defined by the signals ±a(0 . . . n) and ±b(0 . . . n), respectively, where n equals the number of bits, a comparator formed by a plurality of electronic circuits comprising, a first logic level defining said operands as bipolar signals ±a(0 . . . n) and ±b(0 . . . n), respectively, a second logic level including means for forming the EXCLUSIVE-OR of said operands ±a(0 . . . n) and ±b(0 . . . n) on a bit-by-bit basis to form signals –DIF and including means for forming the EXCLUSIVE-NOR of the operands ±a(0 . . . n) and ±b(0 . . . n) on a bit-by-bit basis to form signals –SAM, a third logic level including means for combining groups of said signals –DIF and including means for combining groups of said signals –SAM, a fourth logic level including means for combining the signals from said first, second and third logic levels to form signals FIRST DIF which specify that the first difference from high-order to low-order between corresponding bits in said first and said second operands is a 1 in said first operand, and said fourth logic level further including means for combining the signals from said first, second and third logic levels to form signals FIRST SAM which specify that the first identity between the bits in said first and second operands is a 1, means responsive to said FIRST SAM signals when both said operands are positive and when said first identity is a 1 for indicating that an overflow will exist in the addition of said first and second operands, means responsive to the absence of identity in any corresponding bit position of said first and second operands when both said operands are negative to indicate that an overflow will exist in the addition of said first and second operands, means responsive to said FIRST SAM signals when both said operands are negative and when said first identity is a 0 for indicating that an overflow will exist in the addition of said first and second operands.

13. In a data processing system operative for executing instructions, said system including apparatus for fetching and storing first and second operands in connection with the execution of instructions, said first and second operands including a plurality of ordered bits defined by the signals ±a(0 . . . n) and ±b(0 . . . n), respectively, where n equals the number of bits, a comparator formed by a plurality of electronic circuits comprising, a first logic level defining said operands as bipolar signals ±a(0 . . . n) and ±b(0 . . . n), respectively, a second logic level including means for forming the EXCLUSIVE-OR of said operands ±a(0 . . . n) and ±b(0 . . . n) on a bit-by-bit basis to form signals –DIF and including means for forming the EXCLUSIVE-NOR of the operands ±a(0 . . . n) and ±b(0 . . . n) on a bit-by-bit basis to form signals –SAM, a third logic level including means for combining groups of said signals –DIF and including means for combining groups of said signals –SAM, a fourth logic level icluding means for combining the signals from said first, second and third logic levels to form signals FIRST DIF which specify that the first difference from high-order to low-order between corresponding bits in said first and said second operands is a 1 in said first operand, and said fourth logic level further including means for combining the signals from said first, second and third logic levels to form signals FIRST SAM which specify that the first identity between the bits in said first and second operands is a 1, means responsive to said FIRST DIF signals indicating an absence of any difference when said operands are of opposite signs to indicate an overflow will exist in a subtraction of said operands, means responsive to said FIRST DIF signals when said first operand is positive and includes a 1 in the first corresponding non-identity location when said second operand is negative and includes a 0 to indicate an overflow will exist in a subtraction of said operands, means responsive to said FIRST DIF signals when said first operand is negative and includes a 0 in the first non-identity position while the second operand is positive and includes a 1 in the corresponding bit position to indicate an overflow will exist in the subtraction of said operands.

14. In a data processing system operative for executing instructions including comparison, addition and subtraction instructions, said system including apparatus for fetching and storing first and second operands in connection with the execution of instructions, said first and second operands including a plurality of ordered bits defined by the signals ±a(0 . . . n) and ±b(0 . . . n), respectively, where n equals the number of bits, a method of electronic comparison comprising the steps of, forming bipolar signals ±a(0 . . . n) and ±b(0 . . . n) for defining said first and second operands, respectively, forming the EXCLUSIVE-OR of said first and second operands on a bit-by-bit basis to form the signals –DIF, forming the EXCLUSIVE-NOR of the first and second operands on a bit-by-bit basis to form the signals –SAM, logically combining groups of said signals –DIF, logically combining groups of said signals –SAM to form the signals –DIF(G) and –SAM(G), respectively, means for combining said signals ±a(0 . . . n), ±b(0 . . . n), –DIF, –SAM, –DIF(G) and –SAM(G) forming the signals FIRST DIF which specify that the first difference from high-order to low-order between corresponding bits in said first and said second operands is a 1 and forming the signals FIRST SAM which specify that the first identity between the bits in said first and second operands is a 1.

15. In a data processing system, an operand comparator for comparing first and second operands comprising, first means for simultaneously comparing corresponding bits in the first and second operands to detect the first occurrence from highest-order toward lowest-order, of a pre-determined equality relationship between corresponding bits, second means for specifying a type of operation being performed on said first and second operands, third means for combining signals from said first and second means for determining an equality relationship between said first and second operands.

16. In a data processing system operative for executing instructions, said system including apparatus for fetching and storing first and second operands in connection with the execution of instructions, said first and second operands including a plurality of ordered bits defined by the signals $\pm a(0 \ldots n)$ and $\pm b(0 \ldots n)$, respectively, where $n$ equals the number of bits, a comparator formed by a plurality of electronic circuits comprising, a first logic level defining said operands as bipolar signals $\pm a(0 \ldots n)$ and $\pm b(0 \ldots n)$, respectively, a second logic level including means for forming the EXCLUSIVE-OR of said operands $\pm a(0 \ldots n)$ and $\pm b(0 \ldots n)$ on a bit-by-bit basis to form signals −DIF and including means for forming the EXCLUSIVE-NOR of the operands $\pm a(0 \ldots n)$ and $\pm b(0 \ldots n)$ on a bit-by-bit basis to form signals −SAM, a third logic level including means for combining groups of said signals −DIF and including means for combining groups of said signals −SAM, a fourth logic level including means for combining the signals from said first, second and third logic levels to form signals FIRST DIF which specify that the first difference from high-order to low-order between corresponding bits in said first and said second operands is a 1 in said first operand, and said fourth logic level further including means for combining the signals from said first, second and third logic levels to form signals FIRST SAM which specify that the first identity between the bits in said first and second operands is a 1, a plurality of circuits responsive to the signals of said first, second, third and fourth logic levels for specifying a plurality of equality relationships between said first and second operands.

17. In a data processing system operative for executing instructions, said system including apparatus for fetching and storing first and second operands in connection with the execution of instructions, said first and second operands including a plurality of ordered bits defined by the signals $\pm a(0 \ldots n)$ and $\pm b(0 \ldots n)$, respectively, where $n$ equals the number of bits, a comparator formed by a plurality of electronic circuits comprising, a first logic level defining said operands as bipolar signals $\pm a(0 \ldots n)$ and $\pm b(0 \ldots n)$, respectively, a second logic level including means for forming the EXCLUSIVE-OR of said operands $\pm a(0 \ldots n)$ and $\pm b(0 \ldots n)$ on a bit-by-bit basis to form signals −DIF and including means for forming the EXCLUSIVE-NOR of the operands $\pm a(0 \ldots n)$ and $\pm b(0 \ldots n)$ on a bit-by-bit basis to form signals −SAM, a third logic level including means for combining groups of said signals −DIF and including means for combining groups of said signals −SAM, a fourth logic level including means for combining the signals from said first, second and third logic levels to form signals FIRST DIF which specify that the first difference from high-order to low-order between corresponding bits in said first and said second operands is a 1 in said first operand, and said fourth logic level further including means for combining the signals from said first, second and third logic levels to form signals FIRST SAM which specify that the first identity between the bits in said first and second operands is a 1, a plurality of circuits responsive to the signals of said first, second, third and fourth logic levels for specifying a plurality of equality relationships between said first and second operands, means responsive to the instruction processing apparatus and to said plurality of circuits for setting a condition code.

* * * * *

PO-1050
(5/69)

UNITED STATES PATENT OFFICE
CERTIFICATE OF CORRECTION

Patent No. 3,825,895 Dated July 23, 1974

Inventor(s) Dee E. Larsen & Michael R. Clements

It is certified that error appears in the above-identified patent and that said Letters Patent are hereby corrected as shown below:

IN THE CLAIMS:

Claim 9, column 20, line 34, cancel "comparaor" and substitute therefor --comparator--.

Claim 9, column 20, line 38, cancel "re" and substitute therefor --are--.

Claim 13, column 21, line 66, cancel "icluding" and substitute therefor --including--.

Signed and sealed this 8th day of October 1974.

(SEAL)
Attest:

McCOY M. GIBSON JR.
Attesting Officer

C. MARSHALL DANN
Commissioner of Patents